United States Patent
Yeo et al.

(10) Patent No.: US 10,601,344 B2
(45) Date of Patent: Mar. 24, 2020

(54) TRIBOELECTRIC ENERGY HARVESTING DEVICE AND METHOD FOR MANUFACTURING SAME

(71) Applicant: Industry-Academic Cooperation Foundation, Yonsei University, Seoul (KR)

(72) Inventors: Jong-Souk Yeo, Incheon (KR); Jun-Young Lee, Suwon-si (KR)

(73) Assignee: INDUSTRY-ACADEMIC COOPERATION FOUNDATION, YONSEI UNVERSITY, Seoul (KR)

( * ) Notice: Subject to any disclaimer, the term of this patent is extended or adjusted under 35 U.S.C. 154(b) by 295 days.

(21) Appl. No.: 15/125,567

(22) PCT Filed: Mar. 11, 2014

(86) PCT No.: PCT/KR2014/002025
§ 371 (c)(1),
(2) Date: Nov. 28, 2017

(87) PCT Pub. No.: WO2015/137532
PCT Pub. Date: Sep. 17, 2015

(65) Prior Publication Data
US 2017/0187306 A1    Jun. 29, 2017

(51) Int. Cl.
*H02K 1/04* (2006.01)
*H02N 1/04* (2006.01)
(Continued)

(52) U.S. Cl.
CPC ............ *H02N 1/04* (2013.01); *B29C 33/424* (2013.01); *B29C 41/12* (2013.01); *B29C 41/003* (2013.01);
(Continued)

(58) Field of Classification Search
CPC .......... H02N 1/04; B29C 33/424; B29C 41/12
(Continued)

(56) References Cited

U.S. PATENT DOCUMENTS

2002/0115011 A1* 8/2002 Komoto ............. G03G 5/08214
430/125.3
2010/0152524 A1* 6/2010 Sentmanat ............... H02K 7/14
600/16
(Continued)

FOREIGN PATENT DOCUMENTS

| JP | 2010-007260 | 1/2010 |
| KR | 1020110040254 A | 4/2011 |
| KR | 1020130011137 A | 1/2013 |

OTHER PUBLICATIONS

International Preliminary Report on Patentability and Written Opinion for Int. Application No. PCT/KR2014/002025 dated Sep. 22, 2016, 21 pages, WIPO, Geneva, Switzerland.
(Continued)

*Primary Examiner* — Terrance L Kenerly
(74) *Attorney, Agent, or Firm* — Procopio, Cory, Hargreaves & Savitch LLP

(57) ABSTRACT

The present invention relates to a triboelectric energy harvesting device and a method for manufacturing the same. The triboelectric energy harvesting device according to an embodiment of the present invention includes a first frictional layer provided with a first surface having first electron affinity, and a second frictional layer facing the first surface and having second electron affinity, wherein at least one of the first and second frictional layers is formed of an elastic material and is provided in an elastic structure.

18 Claims, 26 Drawing Sheets

(51) Int. Cl.
*B29C 41/12* (2006.01)
*B29C 33/42* (2006.01)
*B29C 41/00* (2006.01)
*B29C 41/04* (2006.01)
*B29K 83/00* (2006.01)
*B29L 31/48* (2006.01)

(52) U.S. Cl.
CPC ........ *B29C 41/045* (2013.01); *B29K 2083/00* (2013.01); *B29K 2995/0003* (2013.01); *B29L 2031/48* (2013.01)

(58) Field of Classification Search
USPC .......................................................... 310/310
See application file for complete search history.

(56) References Cited

U.S. PATENT DOCUMENTS

| | | | |
|---|---|---|---|
| 2010/0253184 A1 | 10/2010 | Choi et al. | |
| 2011/0050181 A1 | 3/2011 | Post et al. | |
| 2011/0084345 A1 | 4/2011 | Park et al. | |
| 2011/0148248 A1* | 6/2011 | Landa ..................... | H01J 45/00 310/306 |
| 2012/0319527 A1* | 12/2012 | Jahnes .................... | B81B 3/001 310/300 |
| 2013/0020909 A1 | 1/2013 | Kim et al. | |
| 2013/0049531 A1* | 2/2013 | Wang ....................... | H02N 1/04 310/309 |
| 2013/0079460 A1* | 3/2013 | Miyahara ............... | C08F 230/08 524/544 |

OTHER PUBLICATIONS

Lee, Jun Young, et al. "Stretchable Triboelectrics Devices for Energy Harvesting and Sensing Applications," ICFPE 2013, Jeju Island, Korea, Sep. 10-13, 2013, 4 pages.

Zhong Lin Wang, "Triboelectric Nanogenerators as New Energy Technology for Self-Powered Systems and as Active Mechanical and Chemical Sensors," International Conference on Nanoscience & Technology, China Sep. 2013 (ChinaNANO 2013), 25 pages.

Post, E. Rehmi, et al. "Electrostatic Power Harvesting in Textiles," Proc. ESA Annual Meeting on Electrostatics 2010, Paper G1, 10 pages.

Lee, Jun Young, et al. "Cost Effective Fabrication of a Triboelectics Energy Harvester Using Soft Lithography," Journal of the Korean Vacuum Society, vol. 22, No. 4, Jul. 2012, pp. 198-203.

International Search Report issued is copending PCT application No. PCT/KR2014/002025 dated Aug. 8, 2015 in 3 pages.

* cited by examiner

TRIBOELECTRIC ENERGY HARVESTING DEVICE AND METHOD FOR MANUFACTURING SAME

CROSS-REFERENCE TO RELATED APPLICATIONS

This is a National Stage entry of PCT/KR2014/002025, filed on Mar. 11, 2014, the entire contents of which are hereby incorporated by reference.

STATEMENT REGARDING PRIOR DISCLOSURES BY THE INVENTORS

The inventors of the present application disclosed the subject matter of the present application on Sep. 11, 2013 at a conference. This prior disclosure has been submitted in an Information Disclosure Statement in the present application as "LEE, Jun Young, et al. "Stretchable Triboelectrics Devices for Energy Harvesting and Sensing Applications," ICFPE 2013, Jeju Island, Korea, Sep. 10-13, 2013, 4 pages," with the disclosure occurring on Sep. 11, 2013.

TECHNICAL FIELD

The present invention disclosed herein relates to a triboelectric energy harvesting device and a method for manufacturing the same.

BACKGROUND ART

Triboelectric energy harvesting devices are elements for converting mechanical energy into useful electric energy by using an electrostatic induction phenomenon due to a frictional contact. Tribo-electricity is generated when materials having electron affinity different from each other are brought into contact through friction. Typical triboelectric energy harvesting devices mostly operate under vertically acting friction force and are realized on a hard surface such as silicon or glass, or on a flexible surface such as a PET or kapton film. Such typical triboelectric energy harvesting devices exhibit low electric power efficiency with respect to an extending deformation and have problems in that the frequency of vibration applied to the devices is variously changed and effectiveness of the devices may not be ensured under an environment in which the direction and the strength of the deformation are not constant. In addition, typical triboelectric energy harvesting devices have low wearability and thus are not suitable to charge wearable electronic devices.

DISCLOSURE OF THE INVENTION

Technical Problem

The present invention provides a triboelectric energy harvesting device and a method for manufacturing the same which are capable of obtaining high electric power efficiency from an external force, particularly from a tensile force by maximizing elasticity.

The present invention also provides a triboelectric energy harvesting device and a method for manufacturing the same which are suitable to charge wearable electronic devices.

The present invention also provides a triboelectric energy harvesting device and a method for manufacturing the same which exhibit high electrical power efficiency with respect to external force having various directions and frequencies.

Problems to be solved by the present invention are not limited to the above-mentioned problems. Other technical problems which have not been mentioned may be clearly understood by those skilled in the art to which the present invention belongs.

Technical Solution

Embodiments of the present invention provide a triboelectric energy harvesting device including: a first frictional layer provided with a first surface having first electron affinity; and a second frictional layer facing the first surface and having second electron affinity, wherein at least one of the first and second frictional layers is formed of an elastic material and is provided in an elastic structure.

In an embodiment, at least one of the first and second frictional layers may be formed of only an elastic material comprising at least one of polydimethylsiloxane, polyurethane, nylon, or the like.

In an embodiment, the elastic structure may include at least one of a hollow structure or a thin film structure having a thickness of about 0.01 µm to about 200 µm.

In an embodiment, the hollow structure may include at least one of a mesh structure or a fabric structure.

In an embodiment, both the first and second frictional layers may be formed of only an elastic material and may be provided in elastic structures.

In an embodiment, the triboelectric energy harvesting device may further include a first electrode layer laminated on the first frictional layer or formed inside the first frictional layer; and a second electrode layer laminated on the second frictional layer or formed inside the second frictional layer.

In an embodiment, at least one of the first and second frictional layers may be formed of a conductive material so as to function as an electrode layer.

In an embodiment, at least one first frictional layer provided with a first electrode layer therein and at least one second frictional layer provided with a second electrode may be alternately laminated.

In an embodiment, at least one of the first and second frictional layers may have elasticity of about 10% to about 1000%.

In an embodiment, at least one of the first and second surfaces may have a pattern structure having an uneven shape.

In an embodiment, the pattern structure may be formed to have intervals of about 1 nm to about 1000 nm.

In an embodiment, the pattern structure may include a plurality of protrusions which protrude from at least one of the first or second surface, and at least one of the protrusions may include at least one of a pyramidal, pillar, or hemispherical shape.

In an embodiment, at least one of the first or second frictional layer may include a spacer formed on at least one of the first or second surface such that the second surface is spaced apart from the first surface.

In an embodiment, the spacer may have elasticity, an end of the spacer may be brought into contact with the second surface on the second surface, and a space part may be formed between the first and second frictional layers.

In an embodiment, the spacer may be formed in a lattice structure on the first surface and the lattice structure may be formed to have intervals of about 1 µm to about 1000 µm.

In an embodiment, the spacer may be formed to have intervals different from each other in at least two or more regions on the first surface.

In other embodiments of the present invention, a method for manufacturing a triboelectric energy harvesting device includes: manufacturing a first frictional layer provided with a first surface having first electron affinity; manufacturing a second frictional layer provided with a second frictional layer having second electron affinity; disposing the first and second frictional layers such that the first and second surfaces face each other, wherein at least one of the first or second surface layer is manufactured to have an elastic material and an elastic structure.

In an embodiment, the manufacturing of the first frictional layer may include: manufacturing a mold having a reverse pattern structure of the first pattern structure having an uneven shape on the first surface; forming a groove having a reverse image to the spacer on the mold; applying and curing a material for forming the first frictional layer on the mold; and separating the first frictional layer from the mold.

In an embodiment, in at least one of the manufacturing of the first frictional layer or the manufacturing of the second frictional layer, at least one of the first or second frictional layer may be formed through at least one of a photography method, an imprinting method, an inkjet method, a drawing method, an electrospinning method, or an electrospray method.

In an embodiment, the method for manufacturing a triboelectric energy harvesting device may further include forming electrode layers on the first and second frictional layers or inside the first and second frictional layers.

Advantageous Effects

According to an embodiment of the present invention, a triboelectric energy harvesting device and a method for manufacturing the same, which are capable of obtaining high electric power efficiency from an external force, particularly from a tensile force by maximizing elasticity, are provided.

In addition, according to an embodiment of the present invention, a triboelectric energy harvesting device and a method for manufacturing the same which are suitable to charge wearable electronic devices are provided.

Effects of the present invention are not limited to the above-mentioned effects. Other effects which have not been mentioned may be clearly understood from the specifications and the accompanying drawings by those skilled in the art to which the present invention belongs.

MODE FOR CARRYING OUT THE INVENTION

Figure 1:
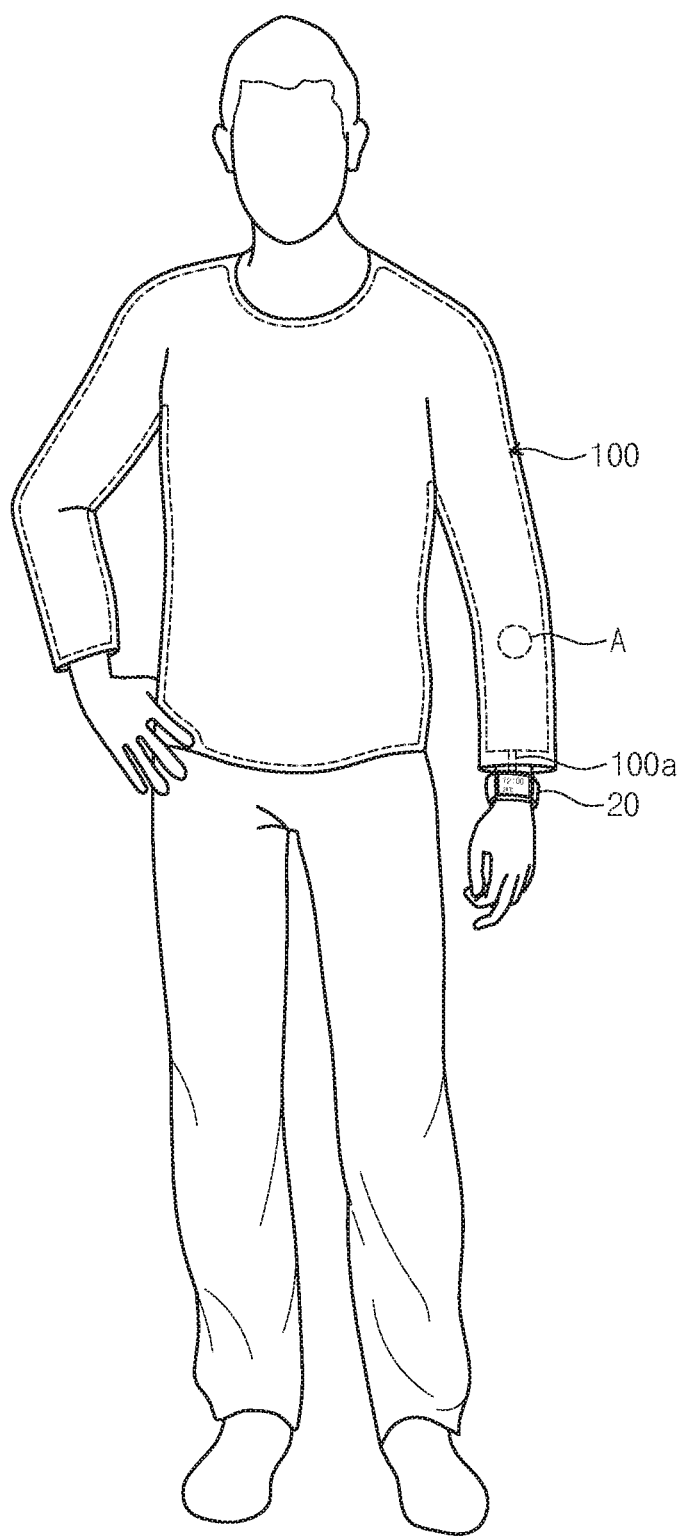
FIG. 1 is a schematic view illustrating a usage state of a triboelectric energy harvesting device according to an embodiment of the present invention.

Advantages and features of the present invention, and implementation methods thereof will be clarified through the following embodiments described with reference to the accompanying drawings. However, the present invention is not limited to the embodiments set forth herein and is only defined by the scope of the claims. Even if not defined, all the terms (including technical or scientific terms) used herein have the same meanings as those generally accepted by typical technologies in the related art to which the present invention pertains. General descriptions on well-known configurations may not be provided so as not to obscure the subject matter of the present invention. In the drawings of the present invention, configurations which are the same as or correspond to each other will be described by using the same reference numerals, if possible. In the present invention, the wording "element A is formed on element B" may have meanings including not only "element A is formed to be directly brought into contact with an upper surface of element B" but also "element A is formed while one or a plurality of other materials are interposed between elements A and B".

A triboelectric energy harvesting device includes a first frictional layer and a second frictional layer. The first frictional layer is provided with a first surface having first electron affinity, and the second frictional layer is provided with a second surface having second electron affinity. At least one of the first and second frictional layers is formed of an elastic material and is provided in a structure. According to an embodiment of the present invention, electric power may be obtained with high efficiency using a triboelectric energy harvesting device having maximized elasticity.

FIG. 1 is a schematic view illustrating a usage state of a triboelectric energy harvesting device according to an embodiment of the present invention. In the embodiment of FIG. 1, a triboelectric energy harvesting device 100 harvests triboelectric energy generated by activities of a user and provides the energy to an electronic device 20 worn by the user through an electricity supply line 100a. An end of the electricity supply line 100a is provided in a shape of a charging jack and may thus be connected to a charging terminal of the electronic device 20 to supply power and disconnected from the charging terminal after supplying power. The triboelectric energy harvesting device 100 may be used, for example, by being attached to an inner or outer surface of user's clothing, the user's skin, or the like. The electronic device 20 may be an electronic terminal like a portable wearable device such as watch-type electronic terminal, spectacle-type electronic terminal or smartphone, or may be an electronic component such as a battery. According to the embodiment of FIG. 1, since the electronic device 20 may be charged in real time by using triboelectric energy generated through user's daily life, the period of charging and exchanging the electronic device 20 is shortened. Accordingly, the user is provided with convenience of using the electronic device 20 for a long time without charging or exchanging a battery.

Figure 2A:
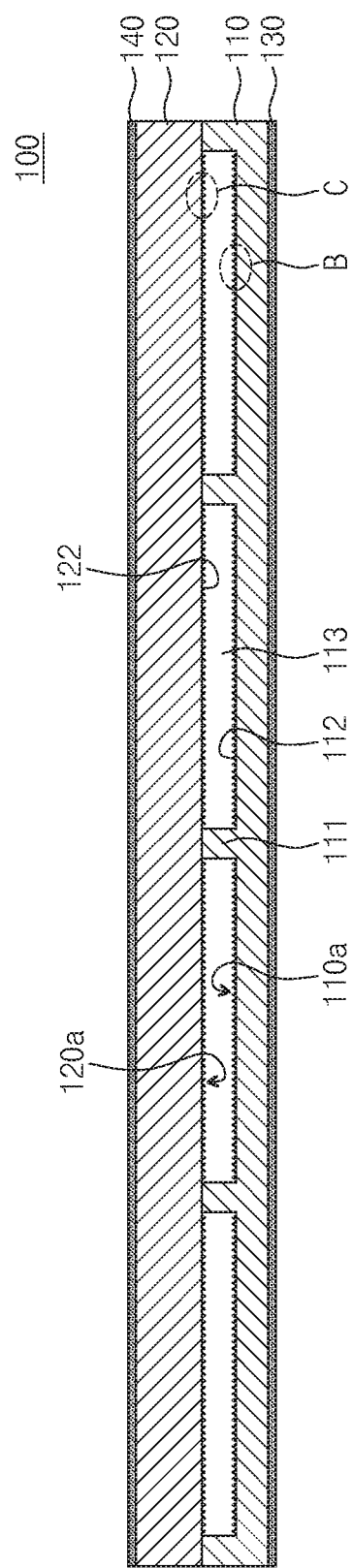
FIG. 2A is a cross-sectional view of an enlarged view a triboelectric energy harvesting device according to an embodiment of the present invention and is an enlarged view illustrating portion "A" illustrated in FIG. 1.

FIG. 2A is a cross-sectional view of an enlarged view a triboelectric energy harvesting device according to an embodiment of the present invention and is an enlarged view illustrating portion "A" illustrated in FIG. 1. Referring to FIGS. 1 and 2A, the triboelectric energy harvesting device 100 according to an embodiment of the present invention includes a first frictional layer 110, a second frictional layer 120, a first electrode layer 130 and a second electrode layer 140. The first and second frictional layers 110 and 120 may maintain a coupled state by static electricity generated through a contact between each other. The first and second frictional layers 110 and 120 may be connected to an electricity supply line 100a.

The first frictional layer 110 is provided with a first surface 110a having a first electron affinity. The first frictional layer 110 has elasticity and may be formed of a first material (an elastic material) having the first electron affinity. The first frictional layer 110 may be formed of only an elastic material. The first and second frictional layers 110 and 120 may be formed to face each other. The second frictional layer 120 is provided with a second surface 120a which faces the first surface 110a and has a second electron affinity. The second frictional layer 120 has elasticity and may be formed of a second material (an elastic material) having the second electron affinity. The second frictional layer 120 may be formed of only an elastic material like the first frictional layer 110.

For example, the first and second frictional layers 110 and 120 may be formed of an elastic material including polydimethylsiloxane, polyurethane, nylon or the like. The first and second frictional layers 110 and 120 may be formed of materials which are different from each other and have electron affinities different from each other. That is, the first and second frictional layers 110 and 120 may have elasticity and may be formed of two materials easily charged in positive charges and negative charges on a triboelectric series.

The first and second frictional layers 110 and 120 may have extendable structures. In the embodiment of FIG. 2A, as an example of the extendable structure, the first and second frictional layers 110 and 120 are provided in a thin film structure having small thicknesses. When the first and second frictional layers 110 and 120 are formed in a small thickness within a range of about 0.01 μm to about 200 μm, the elasticity of the first and second frictional layers 110 and 120 is improved by about 10% to about 1000%. In the specification, the elasticity may be defined as a ratio of a deformed length after extension to an initial length before extension. The efficiency of harvesting triboelectric energy is improved by the elasticity and the recovering force of the first and second frictional layers 110 and 120. As described later with reference to the drawings such as FIG. 13A or FIG. 15A, the first and second frictional layers 110 and 120 may be provided in another elastic structure, for example, a hollow structure such as a mesh structure or a fabric structure.

The first frictional layer 110 includes a spacer 111 formed on the first surface 110a facing the second surface 120a of the second frictional layer 120. The spacer 111 performs a function to space the second surface 120a of the second frictional layer 120 apart from the first surface 110a of the first frictional layer 110. The spacer 111 is formed of an elastic material and may thereby generate a recovering force between the first and second frictional layers 110 and 120. The spacer 111 may be formed of the same material as that of the first surface 110a of the first frictional layer 110. An end of the spacer 111 is brought into contact with the second surface 120a. A space part 113 is formed between the first and second frictional layers 110 and 120 by the spacer 111.

In an embodiment of the present invention, the spacer 111 may be formed in a lattice structure on the first surface 110a. In such an embodiment, the lattice structure of the spacer 111 may be formed to have a gap of about 1 μm to about 1000 μm. The spacer 111 may have a height of 0.1 μm to about 100 μm. The gap and height of the spacer 111 may be varied to be optimized according to an amount of external force, a period of vibration, the amount of deformation due to external force or vibration, or the like, the external force and the vibration mainly occurring under an environment in which the triboelectric energy harvesting device 100 is used. The spacer 111 may have not only a lattice structure but also a structure in which a plurality of dots are arrayed or other various structures. Although not illustrated in the embodiment of FIG. 2A, a plurality of spacer members may be formed on the second surface 120a of the second frictional layer 120. The spacer member of the second frictional layer may perform a function similar to that of the spacer of the first frictional layer.

In the embodiment of FIG. 2A, the electrode layers 130 and 140 are laminated on two surfaces of the first and second frictional layers 110 and 120, the two surfaces not facing each other. That is, the first electrode layer 130 may be formed on a surface opposite the first surface 110a of the first frictional layer 110, and the second electrode layer 140 may be formed on a surface opposite the second surface 120a of the second frictional layer 120. The first and second electrode layers 130 and 140 may be formed of a conductive material. The first and second electrode layers 130 and 140 may be formed of metal such as gold, silver, aluminum or copper, a non-metallic material such as a conductive polymer, conductive graphene, or carbon nano-tubes, nanoparticles of conductive metal or a non-metallic material, nanowires, or the like.

The electrode layers 130 and 140 may be applied not only in a thin film structure but also in various shapes such as a micro-mesh pattern or a fabric structure. The electrode layers 130 and 140 may be formed not only on the upper or lower portions of the frictional layers but also inside the frictional layers. For example, the electrode layers 130 and 140 may be formed to constitute a middle layer inside the frictional layers 110 and 120 in a direction parallel to the frictional layers 110 and 120, or may also be coaxially formed inside the frictional layers 110 and 120 which form the outer side of a fabric structure.

When friction occurs between the first surface 110a of the first frictional layer 110 and the second surface 120a of the second frictional layer 120, a voltage is generated between the first and second frictional layers 110 and 120 by contact charge and electrostatic induction. Accordingly, a battery of the electronic device 20 may be charged through current flowing in the power supply line 100a. Here, since the first and second frictional layers 110 and 120 are easily extended and contracted by external force parallel to the direction of the layers, the triboelectric energy harvesting efficiency is maximized.

Figure 2B:
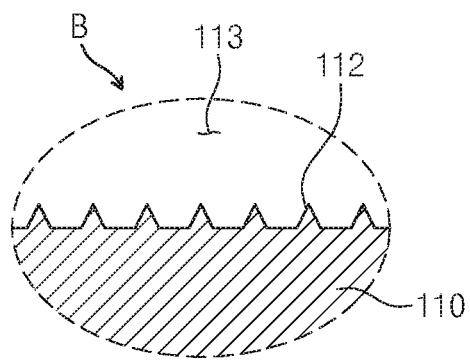
FIG. 2B is an enlarged cross-sectional view illustrating portion "B" illustrated in FIG. 2A.
Figure 2C:
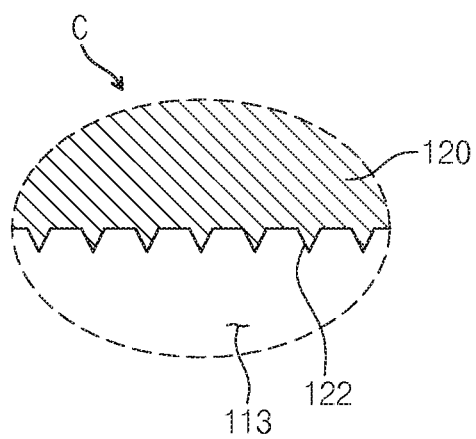
FIG. 2C is an enlarged cross-sectional view illustrating portion "C" illustrated in FIG. 2A.

FIG. 2B is an enlarged cross-sectional view illustrating portion "B" illustrated in FIG. 2A, FIG. 2C is an enlarged cross-sectional view illustrating portion "C" illustrated in FIG. 2A. Referring to FIGS. 2A to 2C, a first pattern structure 112 having an uneven shape on the first surface of the first frictional layer 110, and a second pattern structure 122 having an uneven shape on the second surface of the second frictional layer 120. The pattern structures 112 and 122 may include a plurality of protrusions protruding from the surfaces 110a and 120a of the frictional layers 110 and 120, the surfaces facing each other. The pattern structures 112 and 122 may be formed to have a nano-interval, for example, an interval of about 1 nm to about 1000 nm. That is, the intervals between the protrusions constituting the pattern structures 112 and 122 may be about 1 nm to about 1000 nm. The protrusions constituting the pattern structures 112 and 122 may be provided in a shape such as a pyramid, a pillar, or a hemisphere.

The triboelectric energy harvesting device 100 according to an embodiment of the present invention is formed to have elasticity as a whole. The flexibility (elasticity) of the triboelectric energy harvesting device 100 may be about 10% to about 1000%. This means that triboelectric energy harvesting device 100 may be extended to about 1.1 to 11 times of the original length and then contracted to the original length. Accordingly, the triboelectric energy harvesting device 100 according to an embodiment of the present invention may be applied under various environments in which deformation of being bent in a curved surface, often extended, folded, or bent occur, and may be easily applied to be attached to the skin, clothing or the like of a human to charge a wearable electronic devices.

In an embodiment of the present invention, the triboelectric energy harvesting device 100 may be formed to have a small thickness of several hundred micrometer or less according to the thickness of the frictional layers 110 and 120, the height of the spacer 111, and the like. Accordingly, although the triboelectric energy harvesting device 100 according to an embodiment of the present invention is attached to clothing or a surface of a human, there is nearly no inconvenience due to the thickness increase, and when polydimethylsiloxane is used as the frictional layers, the device may be easily attached in a patch form, thereby having excellent applicability.

When a frictional force is applied to the triboelectric energy harvesting device 100 according to an embodiment of the present invention, the thin frictional layers 110 and 120 deform to be contracted, extended, bent, or the like. Due to differences in electro negativity between the frictional layers 110 and 120, an electric signal is generated due to a triboelectric effect at an interface between the frictional layers 110 and 120. An electric output of the triboelectric energy harvesting device 100 is improved by a distance between the frictional layers 110 and 120 and a recovering force of the spacer 111 having a micro scale.

For example, when external force or vibration occur, a lower surface of the upper layer part, that is, the second surface 120a, and an upper surface of the lower layer part, that is, the first surface 110a are brought into contact with each other, while the spacing distance between the frictional layers is reduced. When the external force is removed, recovering force is formed due to elasticity of the frictional layers 110 and 120 and the spacer 111, the distance between the upper and lower layer parts is recovered while maintaining an initial spacing distance, and power is generated due to tensile force generated while the frictional layers 110 and 120 are extended and then contracted. That is, since both the surfaces contacting each other in the frictional layers 110 and 120 are formed of materials having electron affinity different from each other, when the frictional layers 110 and 120 contact and are then separated from each other, the layers are charged to have polarities different from each other and an electric potential is generated between the upper and lower layer parts by an amount of charged charges, and thus current flows between the electrode layers 130 and 140.

Here, contact and non-contact states repeatedly occur due to the spacer 111 between the frictional layers 110 and 120, and thus an output efficiency of electrical energy is improved. In addition, when the frictional layers 110 and 120 contact with each other, a contact area between the first and second surfaces 110a and 120a due to the pattern structures 112 and 122 and thus the power generating efficiency is greatly improved. The triboelectric energy harvesting device 100 according to an embodiment of the present invention has an omnidirectional characteristic, is operated to harvest energy not only by vertically applied external force but also by force applied in upper, lower, left, and right directions, and generates power with a high efficiency with respect to a very small amount of force.

Figure 3A:
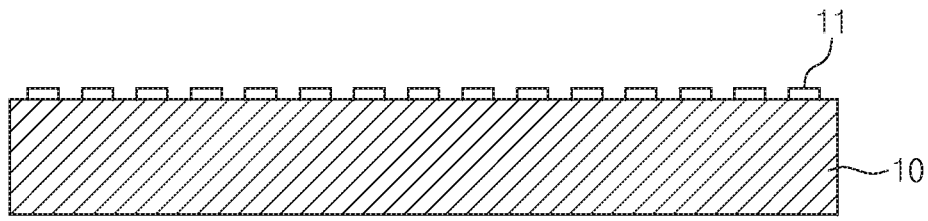
FIGS. 3A to 3D are views illustrating a process of manufacturing a mold for manufacturing a triboelectric energy harvesting device according to an embodiment of the present invention.
Figure 3B:
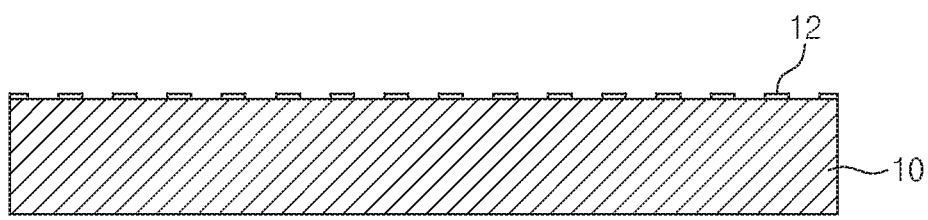
Figure 3C:
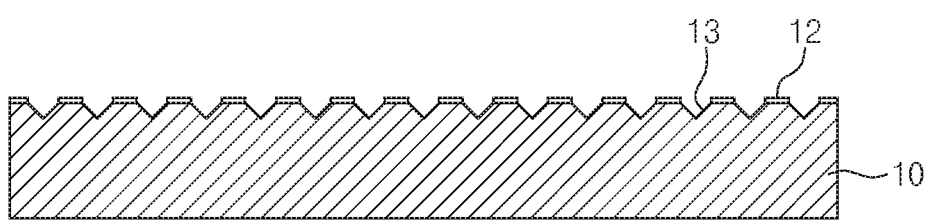
Figure 3D:
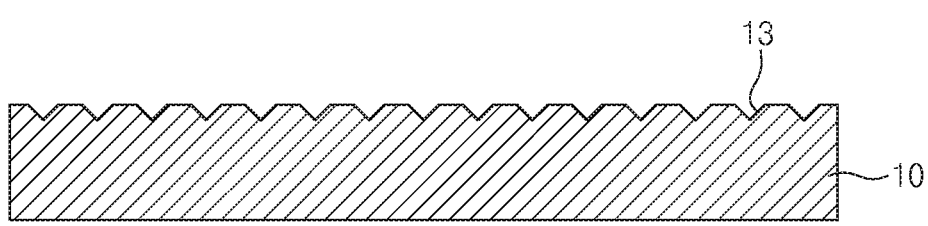

FIGS. 3A to 6C are views for illustrating a method for manufacturing a triboelectric energy harvesting device according to an embodiment of the present invention. FIGS. 3A to 3D are views illustrating a process of manufacturing a mold for manufacturing a triboelectric energy harvesting device according to an embodiment of the present invention. First, as illustrated in FIGS. 3A to 3B, a photoresist 11 is patterned through a photolithography on a substrate 10 such as a silicon substrate, and then a deposition layer 12 is formed by depositing a material such as SiN or SiO$_2$ on the substrate 10. Referring to FIGS. 3C to 3D, a reverse pattern structure 13 corresponding to an reverse image of the first pattern structure 112 is formed on the substrate 10 through an anisotropic wet-etching process using a KOH solution or the like, and then a mold having the reversed pattern structure of the first pattern structure 112 is manufactured on an upper surface thereof by removing the deposition layer 12.

Figure 4A:
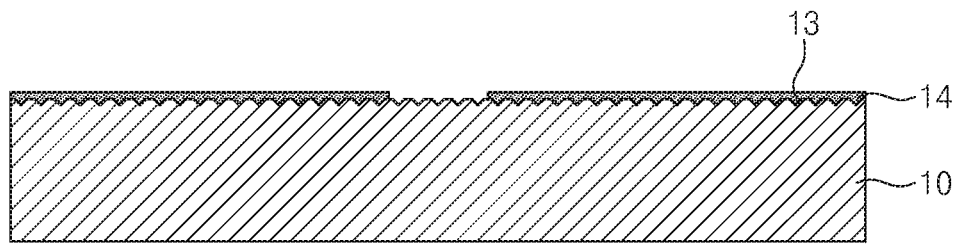
FIGS. 4A to 4C are views illustrating a process of forming a groove having an inverted image of a spacer on the mold manufactured through the process illustrated in FIGS. 3A to 3D.
Figure 4B:
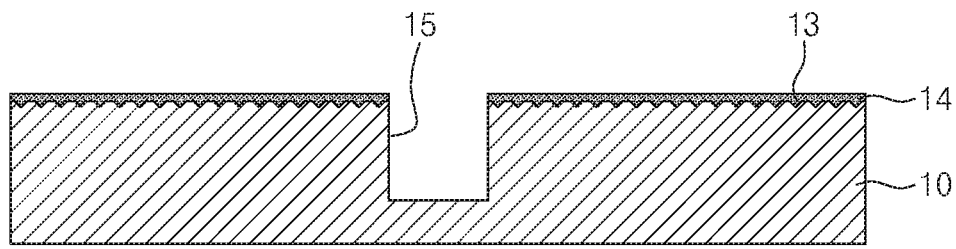
Figure 4C:
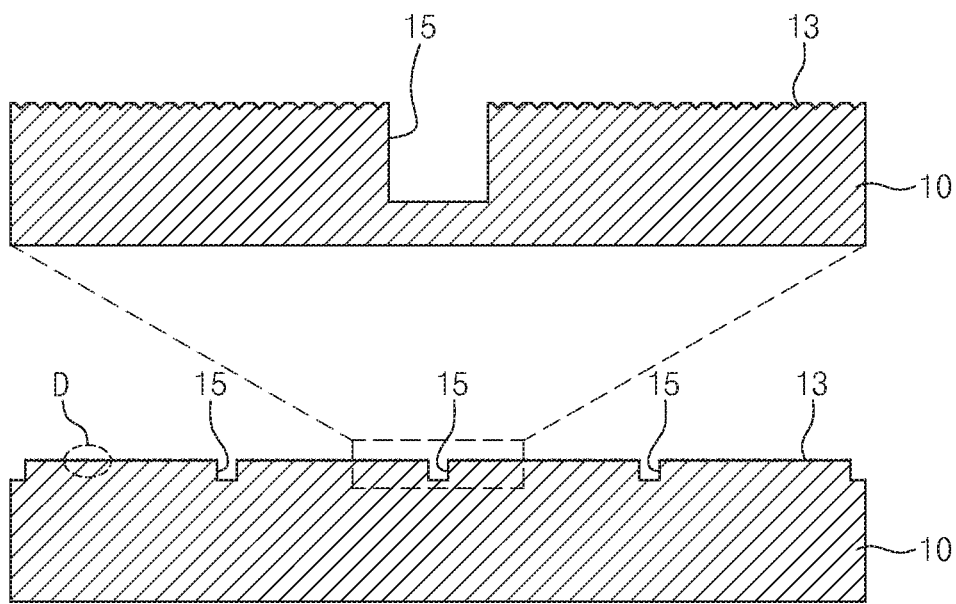
Figure 5:
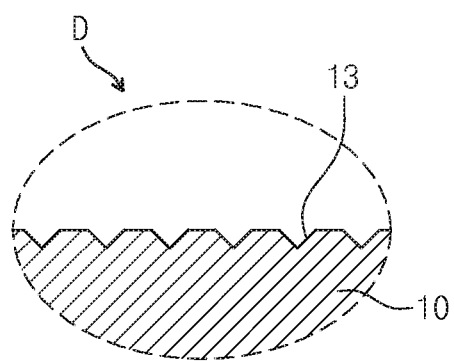
FIG. 5 is an enlarged cross-sectional view illustrating portion "D" illustrated in FIG. 4.

FIGS. 4A to 4C are views illustrating a process of forming a groove having an inverted image of a spacer on the mold manufactured through the process illustrated in FIGS. 3A to 3D, and FIG. 5 is an enlarged cross-sectional view illustrating portion "D" illustrated in FIG. 4. Referring to FIGS. 4A to 5, a photo-resist 14 is patterned on the substrate 10 on which the reverse pattern structure 130 is formed, is then etched through a method such as an inductively coupled plasma-reactive ion etching or the like to form a groove 15 having a reverse image of the spacer 111, and then the photo-resist 14 is removed.

Figure 6A:
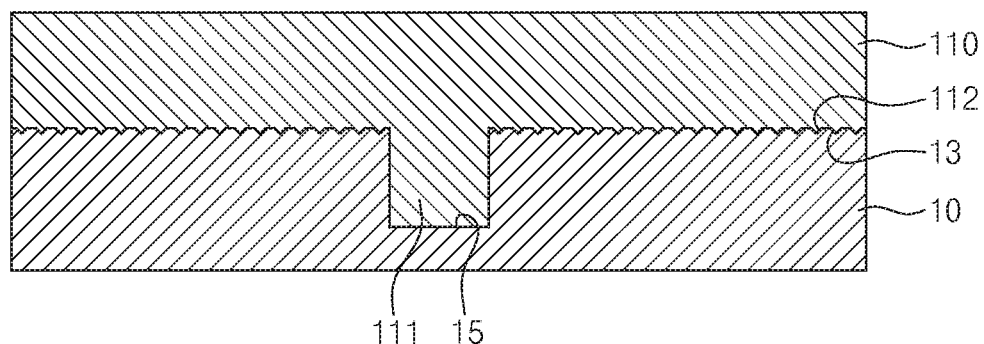
FIGS. 6A to 6C are views illustrating a process of forming a first frictional layer using a mold.
Figure 6B:
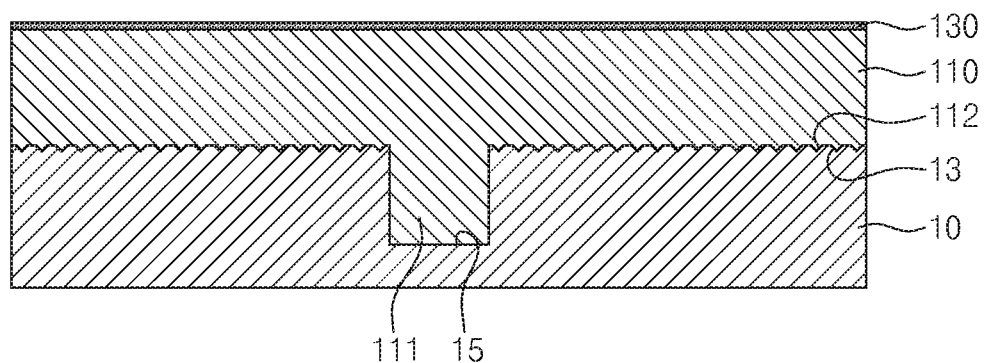
Figure 6C:
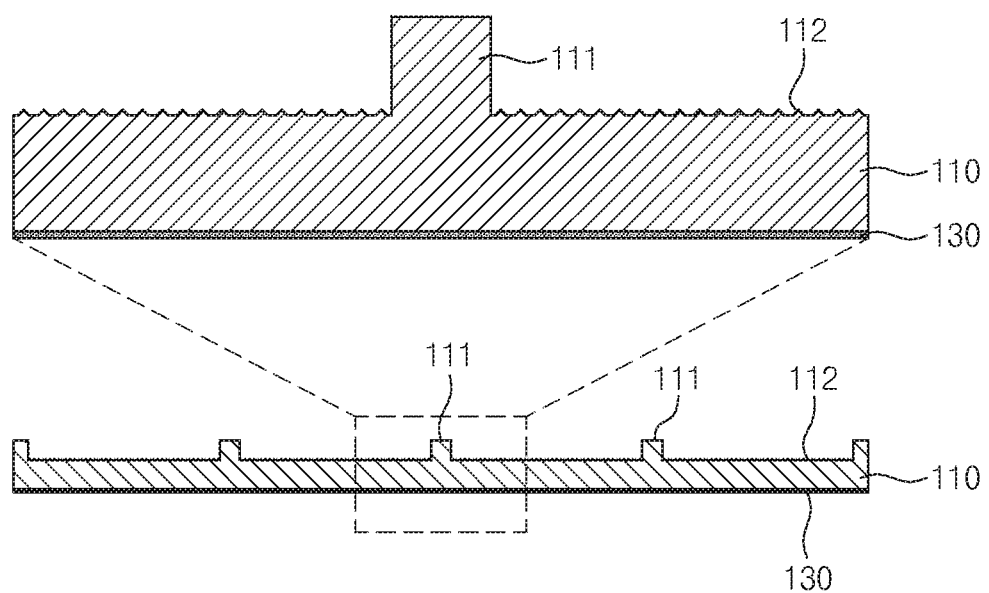

FIGS. 6A to 6C are views illustrating a process of forming a first frictional layer using a mold. Referring to FIG. 6A, a material for forming a first frictional layer 110 is applied on the substrate 10 constituting a mold through a method such as a spin coating or the like, and is then cured through a method such as ultraviolet or thermal curing. Referring to FIG. 6B, a first electrode layer 130 is deposited on the first frictional layer 110. Referring to FIG. 6C, the first frictional layer 110 and the first electrode layer 130 are separated from the mold.

The triboelectric energy harvesting device according to an embodiment of the present invention may be manufactured by a continuous manufacturing process. For example, the mold is formed in a reverse image on a flexible material and is wound about a roll surface of a roll-to-roll apparatus, or the roll is formed in a mold such that a continuous manufacturing may be performed through a roll process. That is, the triboelectric energy harvesting device may be continuously manufactured in a method in which a frictional layer is applied in a liquid phase, and the mold is then cured by ultraviolet or heat and then separated from the mold. The triboelectric energy harvesting device according to an embodiment of the present invention may be mass-manufactured through various methods similar to the above such as a screen printing method, an offset printing method, or the like.

Figure 7A:
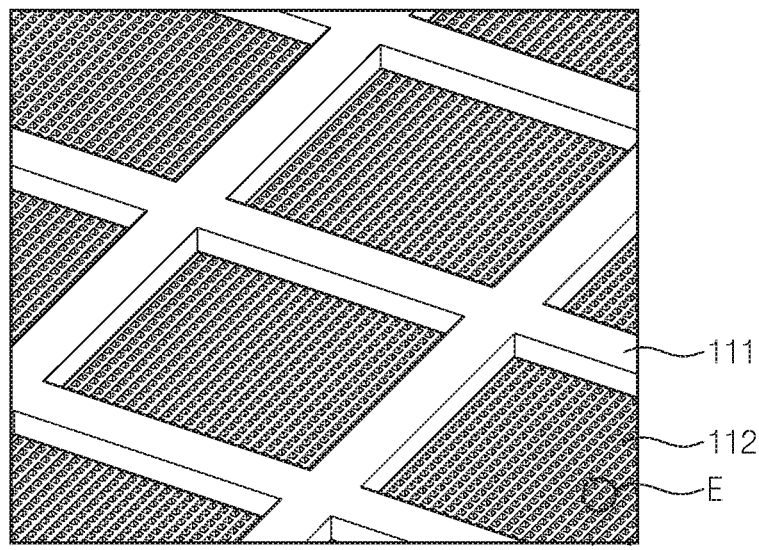
FIG. 7A is a perspective view illustrating the first frictional layer 110 manufactured through processes of FIG. 4A to FIG. 6C.
Figure 7B:
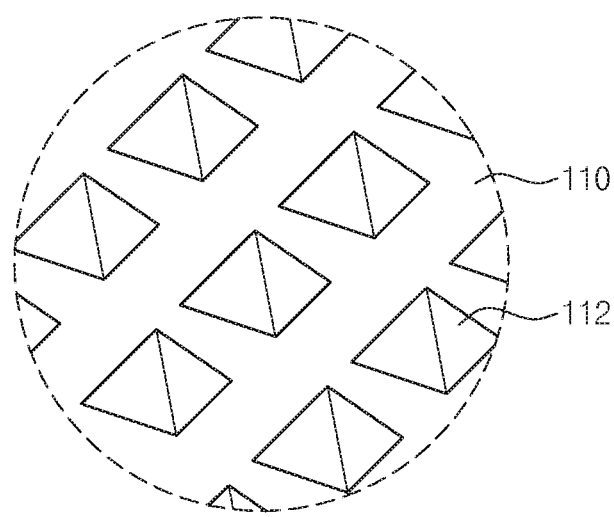
FIG. 7B is a perspective view illustrating portion "E" illustrated in FIG. 7A.

FIG. 7A is a perspective view illustrating the first frictional layer 110 manufactured through processes of FIG. 4A to FIG. 6C, and FIG. 7B is a perspective view illustrating portion "E" illustrated in FIG. 7A. As illustrated in FIGS. 7A to 7B, a first frictional layer 110 having a spacer 111 and a first pattern structure 112 is formed on a first surface 110a through a method of being impressed on a silicon mold in a reversed image. Also, the second frictional layer 120 and the second electrode layer 140 may be formed through a method similar to the process of forming the first frictional layer 110 and the first electrode layer 130 except for the processes for forming the groove 15 for forming the spacer 111 of FIGS. 4A to 4C. The first and second frictional layers 110 and 120 are disposed such that the first surface 110a and the second surface 120a face each other, and thus the triboelectric energy harvesting device according to an embodiment of the present invention may be manufactured.

Figure 8:
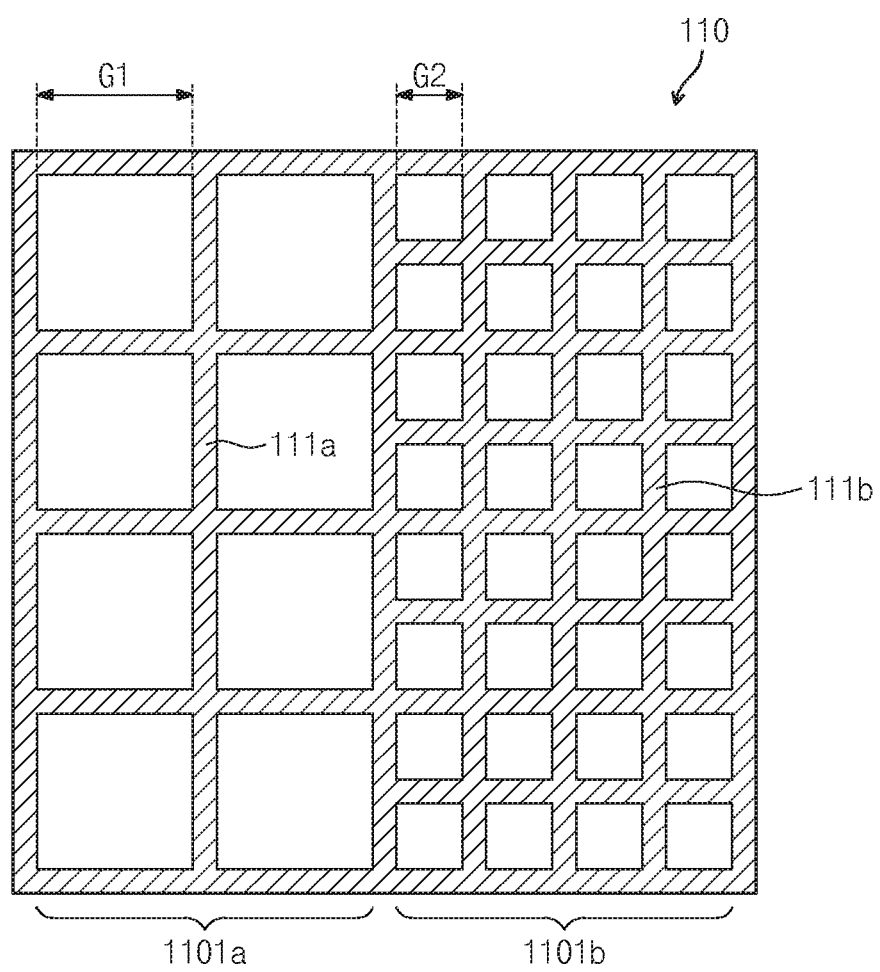
FIG. 8 is a plan view of a triboelectric energy harvesting device according to other embodiment of the present invention.

FIG. 8 is a plan view of a triboelectric energy harvesting device according to another embodiment of the present invention. Referring to FIG. 8, the spacer 111 may be formed to have intervals different from each other in two or more regions on the first surface 110a of the first frictional layer 110. That is, a first spacer 111a formed on a first region 1101a on the first surface 110a may be formed to have a first interval G1 which is relatively wide, and a second spacer 111b formed on a second region 1101b on the first surface 110a is formed to have a second interval G2 which is relatively narrow.

Since the first spacer 111a has high energy conversion efficiency with respect to a vibration having a relatively low frequency band, and the second spacer 111b has high energy conversion efficiency with respect to a vibration having a relatively high frequency band, high energy conversion efficiency may be obtained with respect to a vibration having various frequency ranges. The triboelectric energy harvesting device according to an embodiment of the present invention responds in various frequency ranges and may thus exhibit a high energy harvesting efficiency under an environment in which periods and directions of motions are irregular.

Figure 9A:
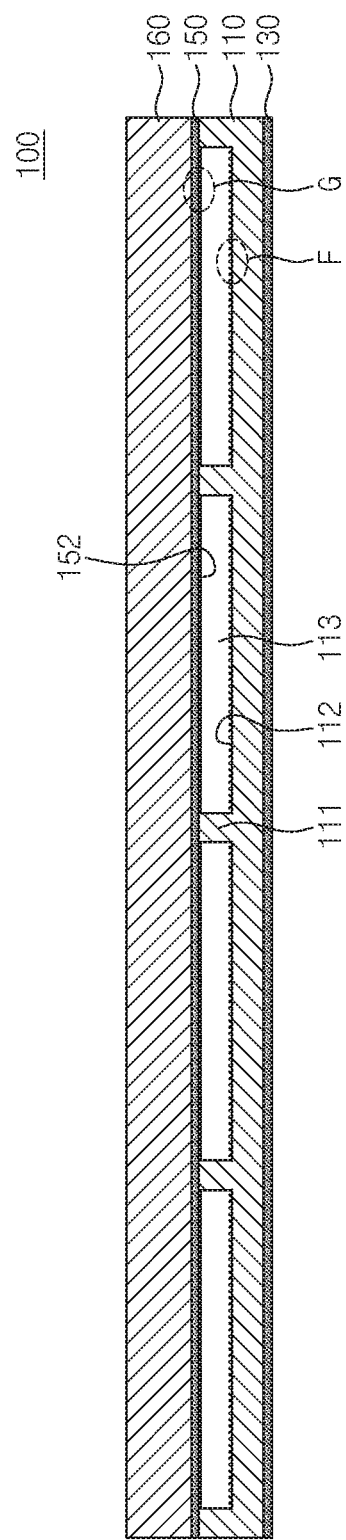
FIG. 9A is a cross-sectional view of a triboelectric energy harvesting device according to still other embodiment of the present invention.
Figure 9B:
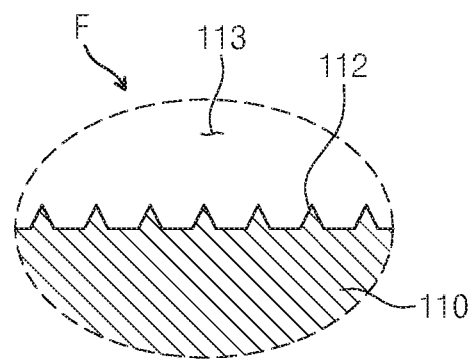
FIG. 9B is an enlarged cross-sectional view illustrating portion "F" illustrated in FIG. 9A.
Figure 9C:
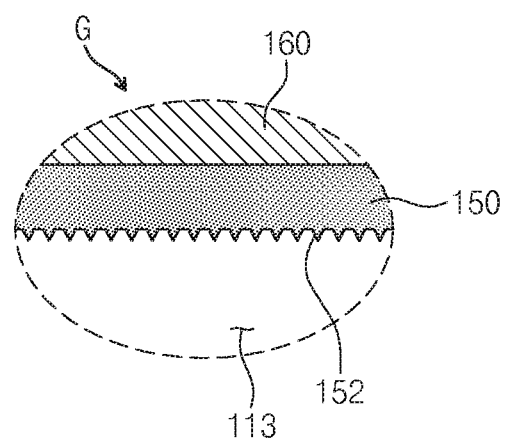
FIG. 9C is an enlarged cross-sectional view illustrating portion "G" illustrated in FIG. 9A.

FIG. 9A is a cross-sectional view of a triboelectric energy harvesting device according to still other embodiment of the present invention, FIG. 9B is an enlarged cross-sectional view illustrating portion "F" illustrated in FIG. 9A, and FIG. 9C is an enlarged cross-sectional view illustrating portion "G" illustrated in FIG. 9A. Referring to FIGS. 9A to 9C, a triboelectric energy harvesting device 100 according to an embodiment of the present invention includes a first frictional layer 110, a first electrode layer 130, a second frictional layer 150, and an elastic member 160. The first frictional layer 110 is provided with a spacer 111 and a first pattern structure 112 on a surface facing the second frictional layer 150. The second frictional layer 150 is provided with a second pattern structure 152 on a surface facing the first frictional layer 110. An elastic member 160 is formed on the second frictional layer 150 to increase the elasticity of an upper layer part of the triboelectric energy harvesting device 100.

In the embodiment of FIGS. 9A to 9C, the second frictional layer 150 is formed of a material having elasticity and conductivity, and is different from the previously described embodiments in not having a separate second electrode layer. That is, the second frictional layer 150 itself functions as an electrode layer of an upper layer, and may supply power by means of voltage and current which are formed between the first electrode layer 130 and the second frictional layer 150. The second frictional layer 150 may be formed of a material such as aluminum, copper, silver, gold, grapheme, or a silver nanowire. Although not shown, it is also possible that the first frictional layer 110 is formed of a conductive material, and the first electrode layer 130 is not provided.

Figure 10A:
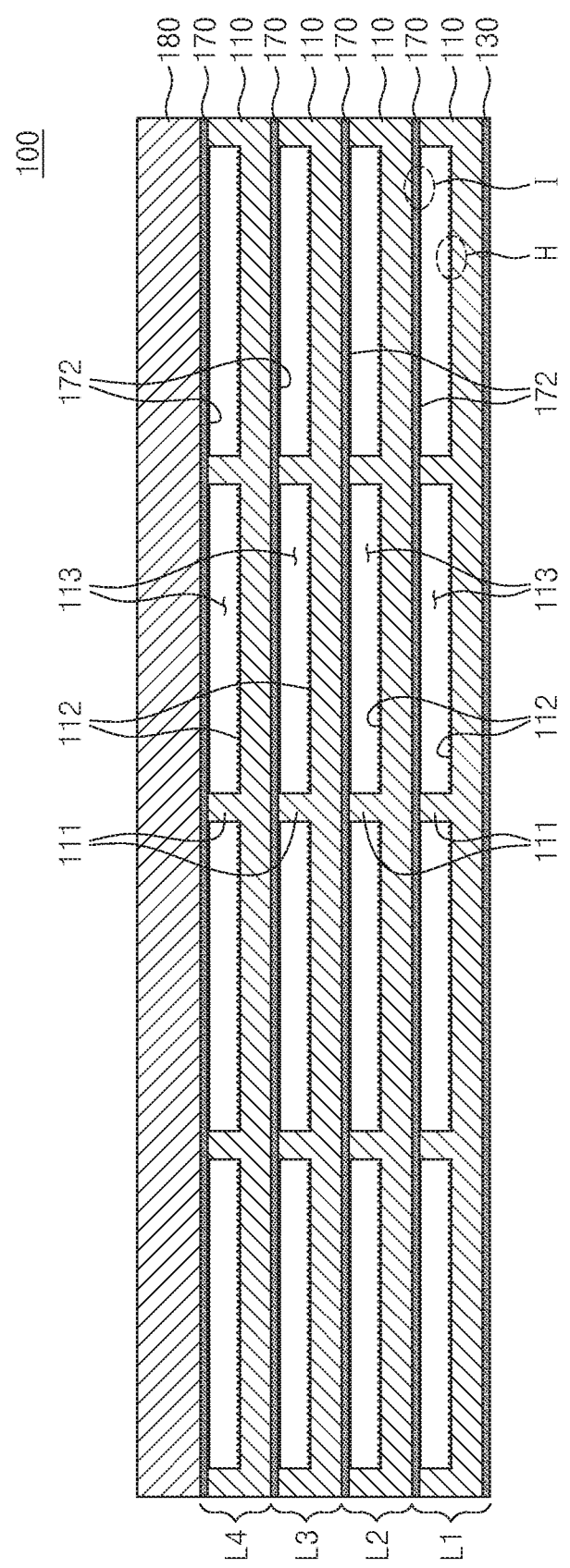
FIG. 10A is a cross-sectional view of a triboelectric energy harvesting device according to even other embodiment of the present invention.
Figure 10B:
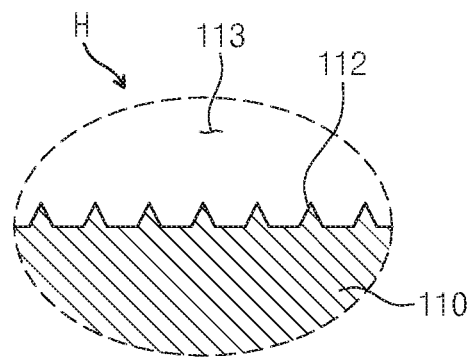
FIG. 10B is an enlarged cross-sectional view illustrating portion "H" illustrated in FIG. 10A.
Figure 10C:
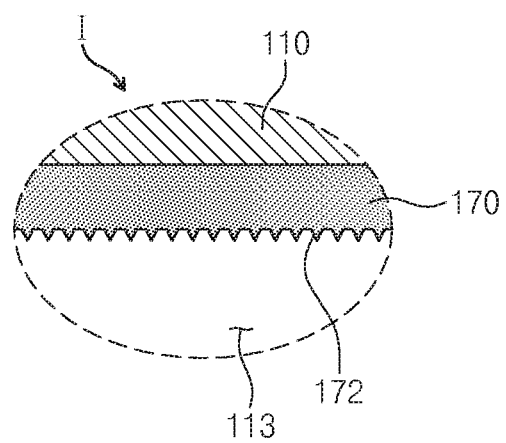
FIG. 10C is an enlarged cross-sectional view illustrating portion "I" illustrated in FIG. 10A.

FIG. 10A is a cross-sectional view of a triboelectric energy harvesting device according to even other embodiment of the present invention, FIG. 10B is an enlarged cross-sectional view illustrating portion "H" illustrated in FIG. 10A, and FIG. 10C is an enlarged cross-sectional view illustrating portion "I" illustrated in FIG. 10A. Referring to FIGS. 10A to 10C, a triboelectric energy harvesting device 100 according to an embodiment of the present invention includes a plurality of energy harvesting layers L1, L2, L3 and L4. Each of the plurality of energy harvesting layers L1, L2, L3 and L4 includes a first frictional layer 110 corresponding to a lower layer, and a second frictional layer 170 corresponding to an upper layer.

The first frictional layer 110 has a spacer 111 and a first pattern structure 112 on a surface facing the second frictional layer 170. The second frictional layer 170 has a second pattern structure 172 on a surface facing the first frictional layer 110. The second frictional layer is formed of a conductive material, and an electrode corresponding to an upper layer in each of energy harvesting layers L1, L2, L3 and L4. According to the embodiment of FIGS. 10A to 10C, power efficiency is doubled due to a laminated structure of the plurality of energy harvesting layers L1, L2, L3 and L4. In FIG. 10A, non-described reference numeral "180" denotes an elastic member imparting elasticity to an upper layer part of the uppermost energy harvesting layer L4.

Figure 11:
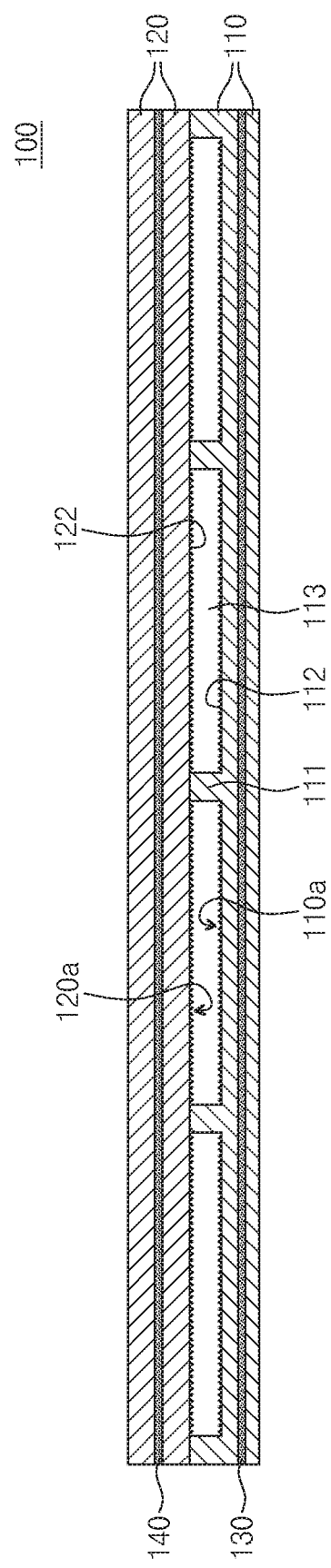
FIG. 11 is a cross-sectional view of a triboelectric energy harvesting device according to yet other embodiment of the present invention.

FIG. 11 is a cross-sectional view of a triboelectric energy harvesting device according to yet other embodiment of the present invention. The embodiment of FIG. 11 is different from that of FIG. 2A in that the first electrode layer 130 and the second electrode layer 140 are formed as intermediate layers respectively inside the first and second frictional layers 110 and 120. According to the embodiment of FIG. 11, a contact between the electrode layers 130 and 140 due to folding or twisting of the frictional layers 110 and 120 are prevented, and tribo-electricity formed between the electrode layers 130 and 140 is blocked so as not to leak, and thus the triboelectric power supply efficiency is improved.

Figure 12:
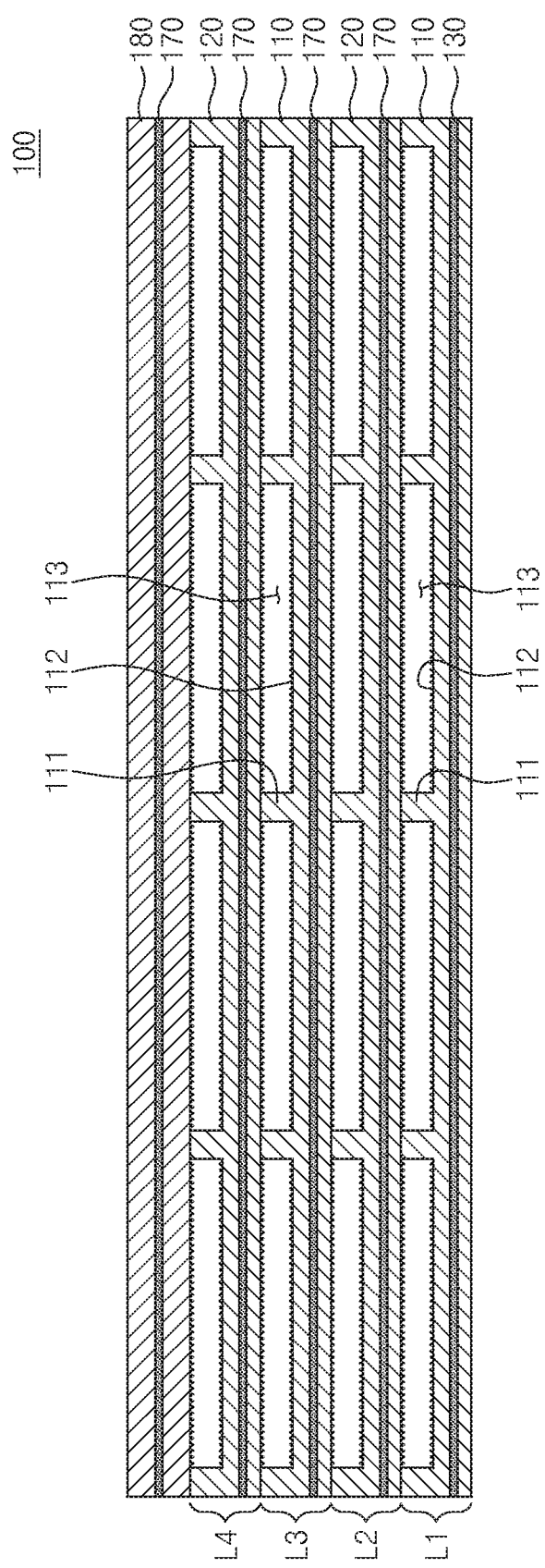
FIG. 12 is a cross-sectional view of a triboelectric energy harvesting device according to further embodiment of the present invention.

FIG. 12 is a cross-sectional view of a triboelectric energy harvesting device according to further embodiment of the present invention. A triboelectric energy harvesting device 100 according to an embodiment of FIG. 12 is provided in a structure in which a plurality of first frictional layers 110 each having an electrode layer 170, and a plurality of second frictional layers 120 each having an electrode layer 170 a first electrode layer 130, a second frictional layer 150, and an elastic member 160 are alternately laminated. According to the embodiment of FIG. 12, power efficiency is doubled due to a laminated structure of the plurality of energy harvesting layers L1, L2, L3 and L4. Also, according to the embodiment of the present invention, since one electrode layer simultaneously functions as an upper electrode of a lower energy harvesting layer and a lower electrode of a lower energy harvesting layer, energy may be harvested with high efficiency by using minimized electrode layers, and the manufacturing process for forming the electrode layers may be simplified.

Figure 13A:
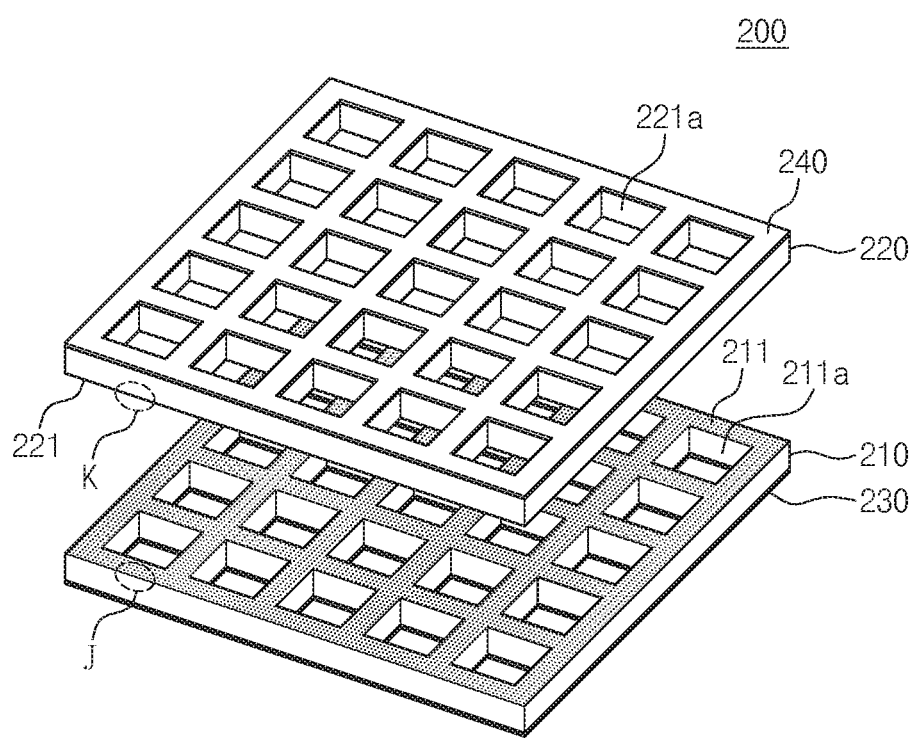
FIG. 13A is a perspective view of a triboelectric energy harvesting device according to still further embodiment of the present invention.
Figure 13B:
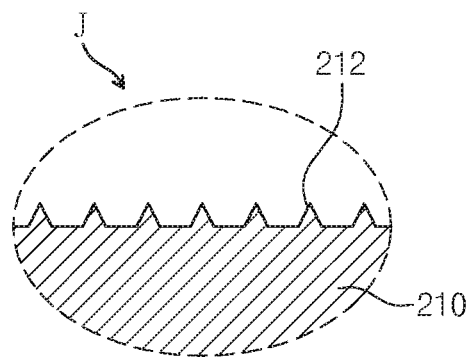
FIG. 13B is an enlarged cross-sectional view illustrating portion "J" illustrated in FIG. 13A.
Figure 13C:
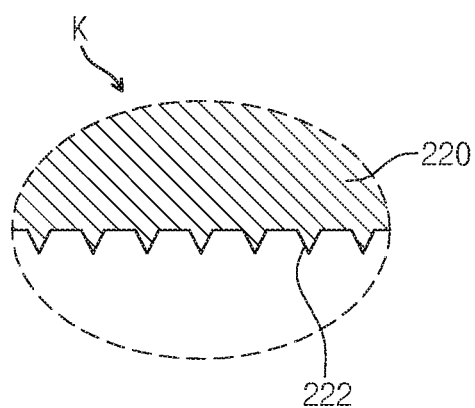
FIG. 13C is an enlarged cross-sectional view illustrating portion "K" illustrated in FIG. 13A.

FIG. 13A is a perspective view of a triboelectric energy harvesting device according to still further embodiment of the present invention, FIG. 13B is an enlarged cross-sectional view illustrating portion "J" illustrated in FIG. 13A, and FIG. 13C is an enlarged cross-sectional view illustrating portion "K" illustrated in FIG. 13A. Referring to FIGS. 13A to 13C, a triboelectric energy harvesting device 200 includes a first frictional layer 210, a second frictional layer 220, a first electrode layer 230, and a second electrode layer 240. The first frictional layer 210 is provided with a first pattern structure 212 on a surface facing the second frictional layer 220, and the second frictional layer 220 is provided with a second pattern structure 222 on a surface facing the first frictional layer 210. The pattern structures 212 and 222 may be provided in a shape similar to the pattern structure in the above-described embodiments, and the overlapping descriptions thereon will not be provided.

The first and second frictional layers 210 and 220 may be disposed to be spaced apart from each other. For example, the first frictional layer 210 may be attached to an inside surface of clothing worn by a user, and the second frictional layer 220 may be attached to the skin of the user. The first frictional layers 210, the second frictional layers 220, the first electrode layer 230, and the second electrode layer 240 may be provided in an elastic structure. The first and second frictional layers 210 and 220 may be formed of only an elastic member. In the embodiment of the FIGS. 13A to 13C, the first frictional layers 210, the second frictional layers 220, the first electrode layer 230, and the second electrode layer 240 have elastic structures, and have mesh structures each having a plurality of hollow parts 211a and 221a which are formed by vertically passing through upper and lower surfaces and lattice structures 211 and 221. The triboelectric energy harvesting device 200 according to the embodiment is formed in a structure having a still greater elasticity due to the hollow parts 211a and 221a and accordingly, and exhibits a high power efficiency.

The triboelectric energy harvesting device 200 according to the embodiment of FIGS. 13A to 13C may be manufactured by a method such as a method in which the frictional layers are micro-patterned in mesh structures through a photolithography method to be selectively deposited or etched, or imprinted by an imprinting method, and are then materials for forming electrode layers are laminated, or an inkjet printing method in which materials for forming the frictional layers are printed in a mesh shape through an ultrasonic jetting method and are then cured. The electrode layers may be laminated after conductive materials are formed on one surface of each the frictional layer by using a directional deposition method.

Unlike FIGS. 13A to 13C, when the electrode layers are to be formed inside the frictional layers, the electrode layers are deposited on the frictional layers and are then coated thereon with materials, such as polymer resins, constituting the frictional layers, and thus the electrode layers may be formed inside the frictional layers. When the electrode layers are formed inside the frictional layers 210 and 220, a contact between the electrode layers 230 and 240 due to folding, twist, or the like of the frictional layers 210 and 220 which have mesh structures may be prevented, and triboelectricity formed between the electrode layers 230 and 240 may be blocked to prevent leak. Thus, triboelectric power supply efficiency may be improved. Although not shown, at least one of the frictional layers 210 and 220 is formed of a material having elasticity and conductivity, and thus a triboelectric energy harvesting device may be realized without a separate electrode layer. In this case, the frictional layers 210 and 220 simultaneously function as electrode layers.

Figure 14A:
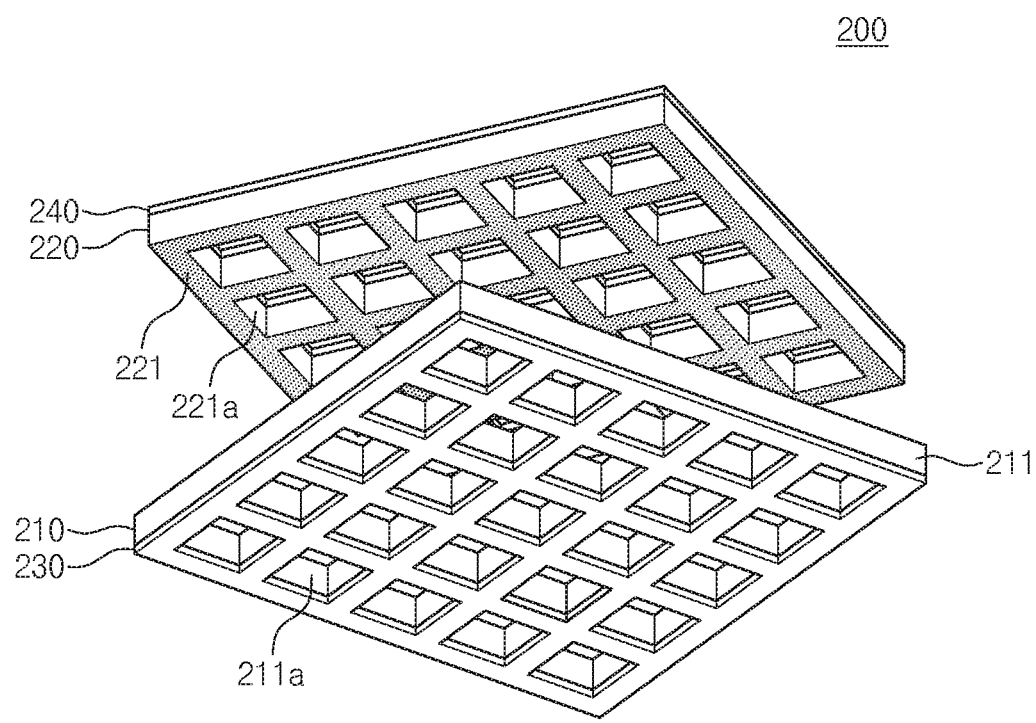
FIG. 14A is a cross-sectional view of a triboelectric energy harvesting device according to even further embodiment of the present invention.

FIG. 14A is a cross-sectional view of a triboelectric energy harvesting device according to even further embodiment of the present invention. Referring to FIG. 14A, a triboelectric energy harvesting device 200 may be formed in a structure in which a first frictional layer 210 and a first electrode layer 230 which correspond to a lower layer part and a second frictional layer 220 and a second electrode layer 240 which correspond to an upper layer part may be formed in a structure in which the second frictional layer 220 and the second electrode layer 240 are laminated in a shape in which arranged structure thereof are not aligned with each other. According to the embodiment of FIG. 14A, since the power is converted such that the upper layer part of the lower layer part is deformed due to external force or vibration applied in various directions, high power efficiency may be obtained. According to the embodiment of FIG. 14A, since the power is converted such that the upper layer part of the lower layer part is deformed due to external force or vibration applied in various directions, high power efficiency may be obtained.

Figure 14B:
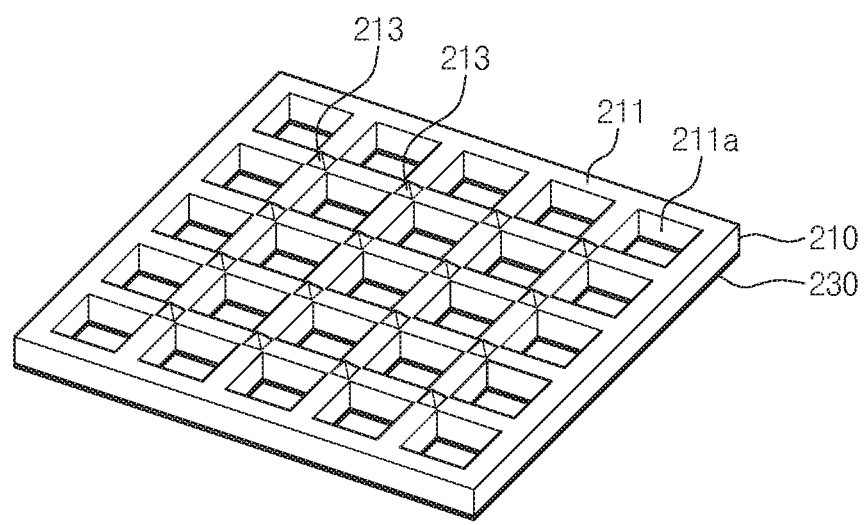
FIG. 14B is a perspective view illustrating a first frictional layer and a first electrode layer which constitute a triboelectric energy harvesting device according to yet further embodiment of the present invention.

FIG. 14B is a perspective view illustrating a first frictional layer and a first electrode layer which constitute a triboelectric energy harvesting device according to yet further embodiment of the present invention. Referring to FIG. 14B, a triboelectric energy harvesting device 200 is different from the embodiment of FIG. 14A in that a plurality of spacers 213 are provided on a surface facing a second frictional layer in the first frictional layer 210. The spacers 213 provide an effect of improving energy harvesting efficiency by maintaining the distance between the two frictional layers facing each other. In addition, the spacer 213 prevent a phenomenon in which mesh structures are torn when the two frictional layers contact each other and are then separated from each other by partially spacing the two frictional layers apart from each other, thereby improving durability. In the embodiment of FIG. 14B, the spacers 213 are formed at crossing points of lattice arrangement structure of the first frictional layer 210, but the formed positions and the number of the spacers may be variously varied according to applying environment of the triboelectric energy harvesting device. Although not shown, the spacers may be formed on a surface of the second frictional layer.

Figure 15A:
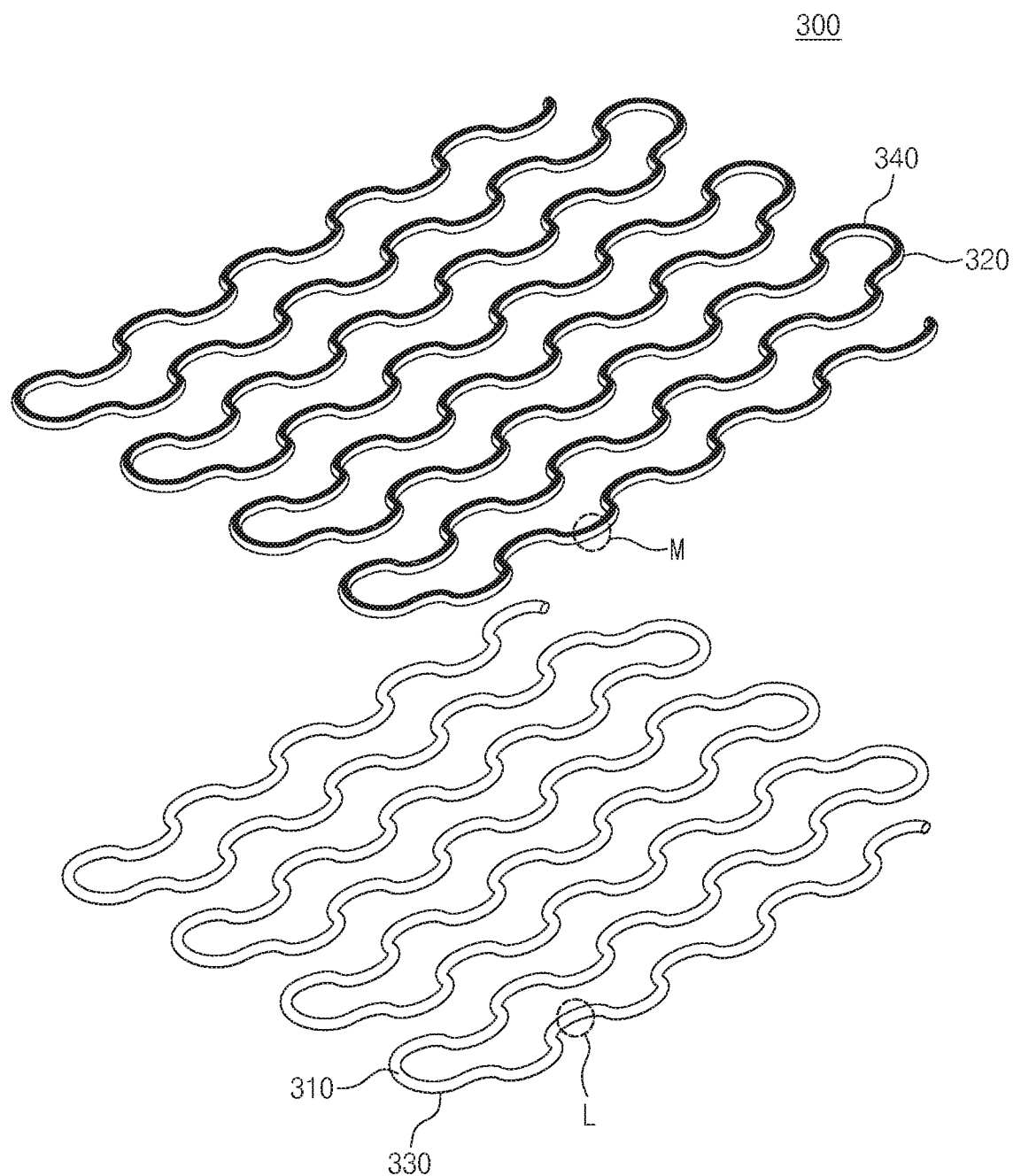
FIG. 15A is a perspective view of a triboelectric energy harvesting device according to another embodiment of the present invention.
Figure 15B:
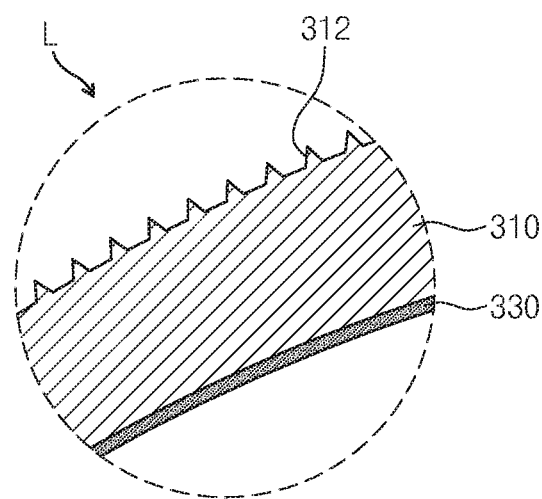
FIG. 15B is an enlarged cross-sectional view illustrating portion "L" illustrated in FIG. 15A.
Figure 15C:
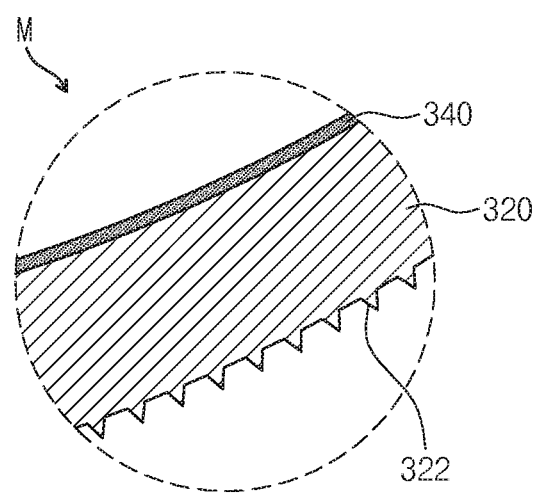
FIG. 15C is an enlarged cross-sectional view illustrating portion "M" illustrated in FIG. 15A.

FIG. 15A is a perspective view of a triboelectric energy harvesting device according to another embodiment of the present invention, FIG. 15B is an enlarged cross-sectional view illustrating portion "L" illustrated in FIG. 15A, and FIG. 15C is an enlarged cross-sectional view illustrating portion "M" illustrated in FIG. 15A. Referring to FIGS. 15A to 15C, a triboelectric energy harvesting device 300 includes a first frictional layer 310, a second frictional layer 320, a first electrode layer 330, and a second electrode layer 340. The first and second frictional layers 310 and 320 may be disposed to be spaced apart from each other. For example, the first frictional layer 310 may be attached to an inside surface of clothing worn by a user, and the second frictional layer 320 may be attached to the skin of the user.

The first and second frictional layers 210 and 220 may be formed of only an elastic member. In the embodiment of FIGS. 15A to 15C, the first frictional layer 310, the second frictional layer 320, the first electrode layer 330, and the second electrode layer 340 may be provided in an elastic structure, that is, a fabric structure. The triboelectric energy harvesting device 300 according the embodiment of FIGS. 15A to 15C has high elasticity due to the frictional layers 310 and 320 having the fabric structure, and therefore exhibits high power efficiency.

The first frictional layer 310 is provided with a first pattern structure 312 on a surface facing the second frictional layer 320, and the second frictional layer 320 is provided with a second pattern structure 322 on a surface facing the first frictional layer 310. The pattern structures 312 and 322 may be provided in a shape similar to the pattern structure in the above-described embodiments, and the overlapping descriptions thereon will not be provided. In the embodiment of FIGS. 15A to 15C, the electrode layers 330 and 340 are formed on two surfaces which do not face each other, but at least one of the frictional layers 310 and 320 may be formed of a conductive material to also function as an electrode, or the electrode layers may also be formed inside the frictional layers.

The triboelectric energy harvesting device 300 according to embodiment of FIGS. 15A to 15C may be manufactured, for example, such that the frictional layers 310 and 320 are formed in advance in fabric structures, and then a conductive electrode layer material is formed on one surface of the frictional layers 310 and 320 through a directional deposition method. The frictional layers 310 and 320 may be manufactured through, for example, a drawing method in which an elastic material is extracted in a fiber shape through a microneedle, or an electrospinning method, electrospray method, or the like.

Unlike FIGS. 15A to 15C, when the electrode layers are to be formed inside the frictional layers, a conductive electrode layer material are deposited on one surface of each of the frictional layers 310 and 320 and are then coated thereon with materials, such as a polymer (a resin), constituting the frictional layers, and thus the electrode layers may be formed inside the frictional layers. When the electrode layers are formed inside the frictional layers 310 and 320, a contact between the electrode layers 330 and 340 due to folding, twist, or the like of the frictional layers 310 and 320 which have mesh structures may be prevented, and triboelectricity formed between the electrode layers 230 and 240 may be blocked to prevent leak. Thus, triboelectric power supply efficiency may be improved.

Figure 16A:
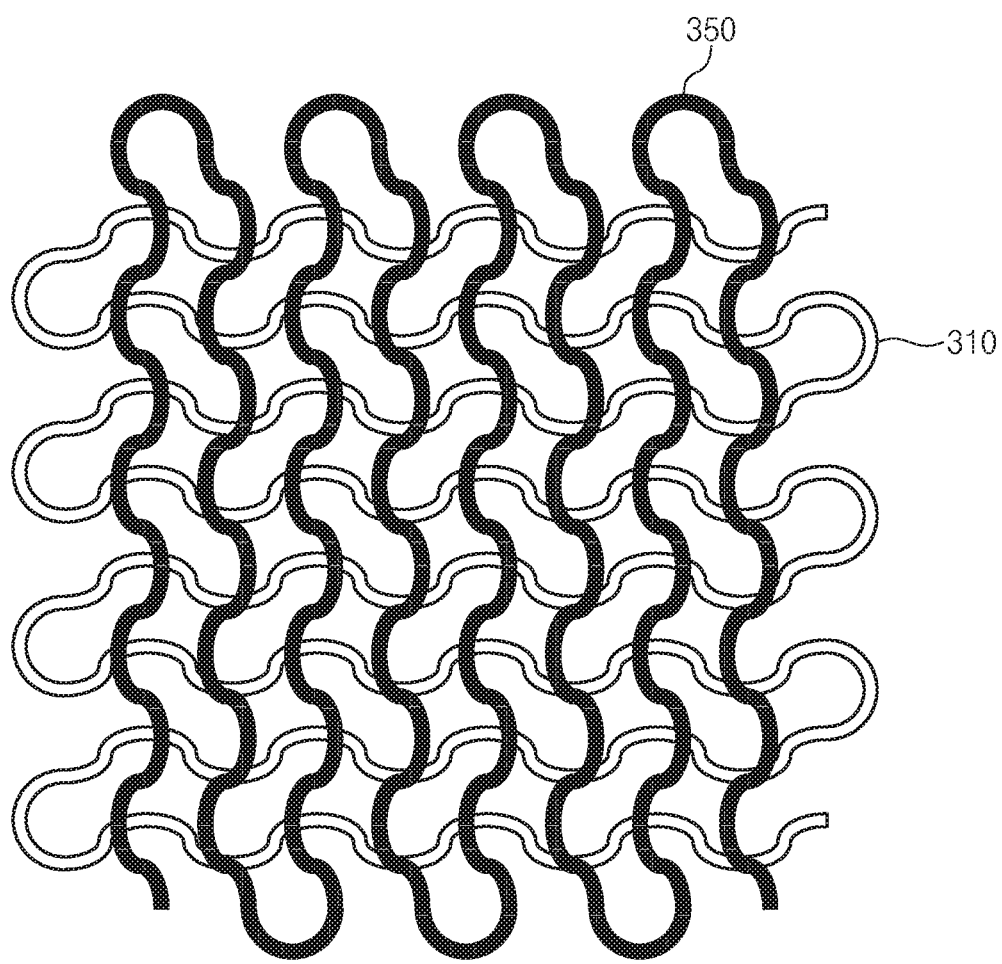
FIG. 16A is a plan view of a triboelectric energy harvesting device according to still another embodiment of the present invention.

FIG. 16A is a plan view of a triboelectric energy harvesting device according to still another embodiment of the present invention. The triboelectric energy harvesting device illustrated in FIG. 16 is different from the embodiment of FIG. 15A in having a structure in which a first electrode layer 350 is formed in a fabric structure in a direction perpendicular to the arrangement direction of the fabric structure of a first frictional layer 310. Although not shown, a second electrode layer may also be formed in a fabric structure in a direction perpendicular to the arrangement direction of a fabric structure of a second frictional layer 320. For example, the frictional layer 310 and the electrode layer 350 may be formed through a drawing method in which an elastic material and a conductive material are respectively extracted through a microneedle.

Figure 16B:
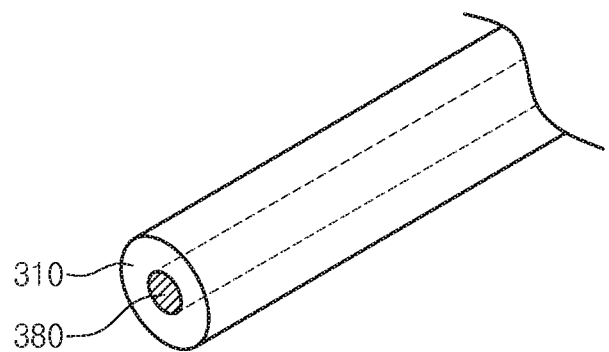
FIG. 16B is a partial perspective view of a triboelectric energy harvesting device according to even another embodiment of the present invention.

FIG. 16B is a partial perspective view of a triboelectric energy harvesting device according to even another embodiment of the present invention. Referring to FIG. 16B, an electrode layer 380 may be formed inside a fabric structure to be coaxial with a frictional layer 310 formed on outer side of the fabric structure. According to the embodiment of FIG. 16B, a contact between the electrode layers 380 and other electrode layers or the like due to folding, twist, or the like of the frictional layer 310 having the fabric structure may be prevented, and tribo-electricity formed in the electrode layer 380 may be blocked to prevent leak. Thus, triboelectric power supply efficiency may be improved. The triboelectric energy harvesting device according to the embodiment of FIG. 16B may be manufactured through an electrospinning method or an electrospray method in which a fiber is manufactured such that a material for forming the electrode layers is formed at an inside thereof and a material for forming the frictional layer is formed at an outer side thereof.

Figure 17A:
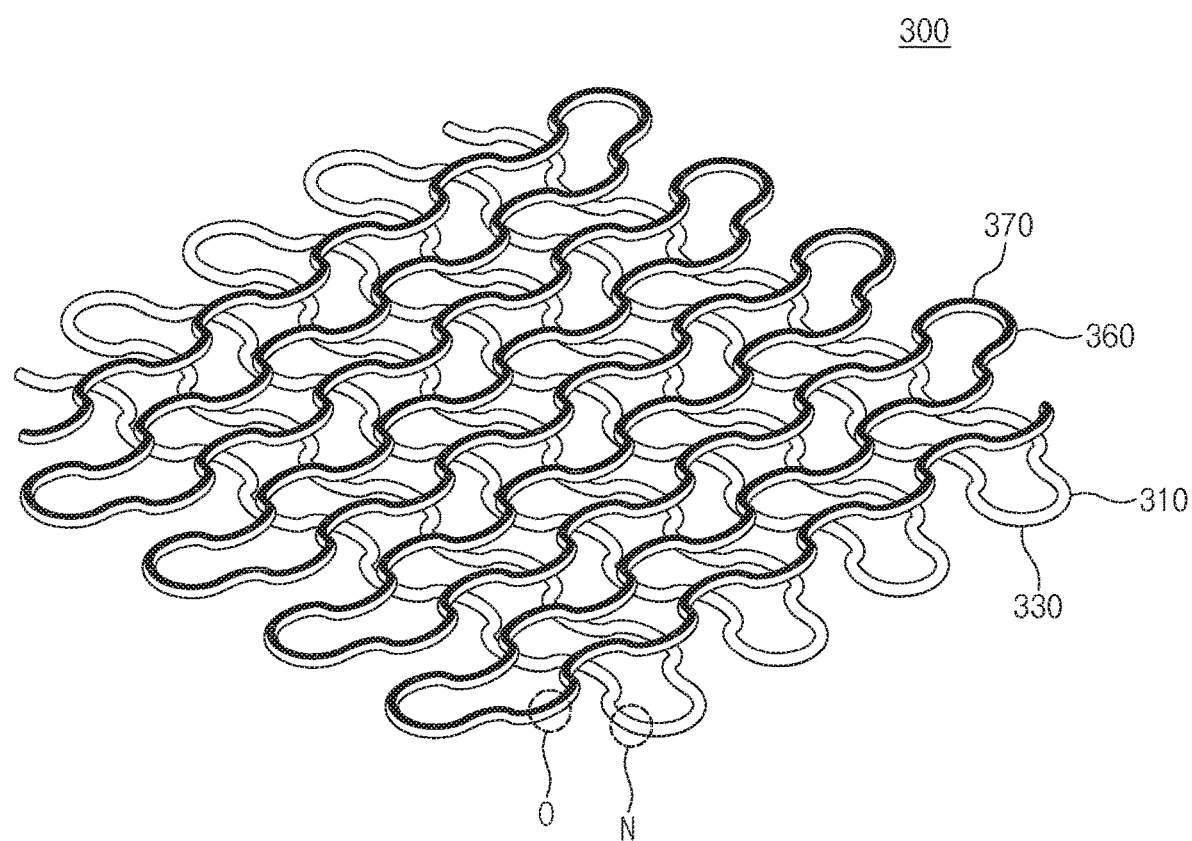
FIG. 17A is a perspective view of a triboelectric energy harvesting device according to yet another embodiment of the present invention.
Figure 17B:
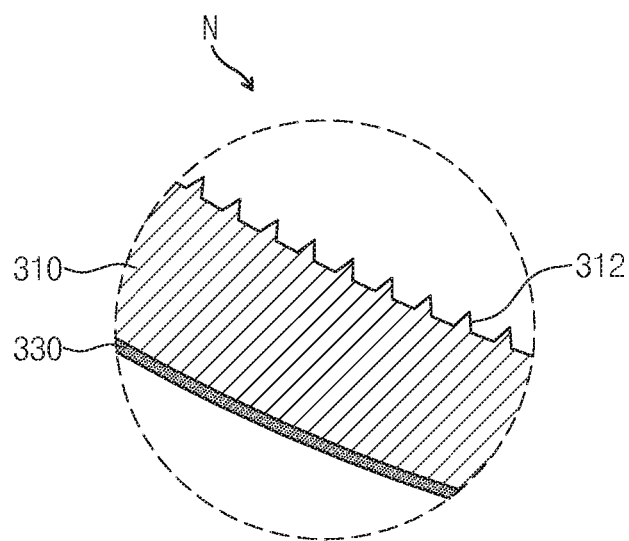
FIG. 17B is an enlarged cross-sectional view illustrating portion "N" illustrated in FIG. 17A.
Figure 17C:
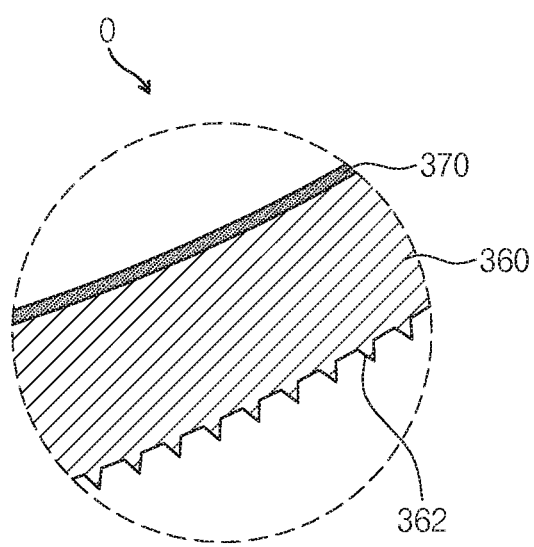
FIG. 17C is an enlarged cross-sectional view illustrating portion "O" illustrated in FIG. 17A.

FIG. 17A is a perspective view of a triboelectric energy harvesting device according to yet another embodiment of the present invention, FIG. 17B is an enlarged cross-sectional view illustrating portion "N" illustrated in FIG. 17A, and FIG. 17C is an enlarged cross-sectional view illustrating portion "O" illustrated in FIG. 17A. Referring to FIGS. 17A to 17C, a triboelectric energy harvesting device 300 includes a first frictional layer 310, a second frictional layer 360, a first electrode layer 330, and a second electrode layer 370. The first frictional layer 310 is provided with a first pattern structure 312 on a surface facing the second frictional layer 320, and the second frictional layer 360 is provided with a second pattern structure 362 on a surface facing the first frictional layer 310.

The first frictional layers 310, the second frictional layers 360, the first electrode layer 330, and the second electrode layer 370 may have fabric structures. The electrode layers 330 and 370 are formed on two surfaces which do not face each other in the frictional layers 310 and 360. The embodiment of FIGS. 17A to 17C is different in the embodiment of FIG. 15A in that a fabric structure arrangement direction of the second frictional layer 360 and the second electrode layer 370 which correspond to an upper layer part is not parallel to but perpendicular to a fabric structure arrangement direction of the first frictional layer 310 and the first electrode layer 330 which correspond to a lower layer part.

Figure 18:
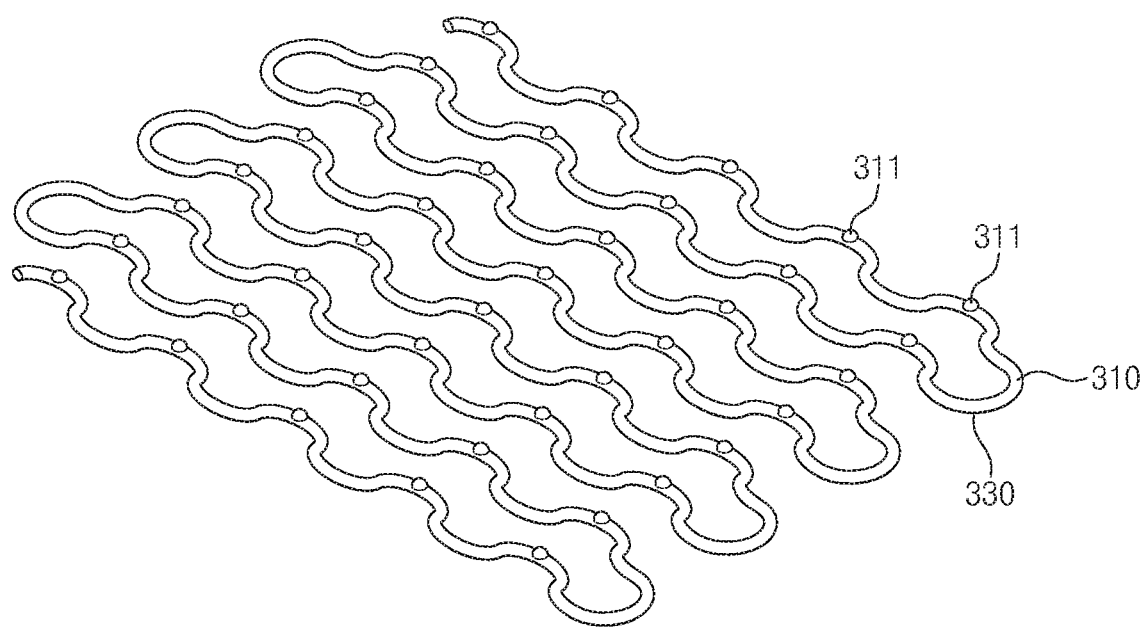
FIG. 18 is a perspective view illustrating a first frictional layer and a first electrode layer which constitute a triboelectric energy harvesting device according to yet still another embodiment of the present invention.

FIG. 18 is a perspective view illustrating a first frictional layer and a first electrode layer which constitute a triboelectric energy harvesting device according to yet still another embodiment of the present invention. Referring to FIG. 18, a triboelectric energy harvesting device is different from the embodiment of FIG. 17A in that a plurality of spacers 311 are provided on a surface facing a second frictional layer in the first frictional layer 310. The spacers 311 provide an effect of improving energy harvesting efficiency by maintaining the distance between the two frictional layers facing each other. In addition, the spacers 311 also have an effect of preventing a phenomenon in which mesh structures are torn when the two frictional layers contact each other and are then separated from each other by partially spacing the two frictional layers apart from each other, thereby improving durability. In the embodiment of FIG. 18, the spacers 311 may be spaced apart a predetermined distance from each other on the first frictional layer 310. The position, number, distance, shape, and the like to form the spacers 311 may be variously varied according to an applying environment or the like of the triboelectric energy harvesting device. Although not shown, the spacers may also be formed on a surface of the second frictional layer.

Since the above embodiments are presented to help the understanding of the present invention, it should be understood that they do not limit the scope of the present invention and various variations thereto also belong to the scope of the present invention. Thus, the technical protective scope of the present invention should be defined by the technical spirit of the following claims and it should be understood that the technical protective scope of the present invention is not limited to the wording of the claims but actually reaches inventions having equivalent technical values.

The invention claimed is:

1. A triboelectric energy harvesting device comprising:
   a first frictional layer provided with a first surface having first electron affinity; and
   a second frictional layer provided with a second surface facing the first surface and having second electron affinity,
   wherein at least one of the first and second frictional layers is formed of an elastic material and is provided in an elastic structure,
   wherein the first frictional layer comprises a spacer formed on thy: first surface to form a space part between the first and the second frictional layers such that the second surface is spaced apart from the first surface, and an end of the spacer being brought into contact with the second surface,
   wherein the spacer has elasticity, the spacer being formed of the same material as the first surface of the first frictional layer, and
   wherein the spacer is formed in a lattice structure on the first surface.

2. The triboelectric energy harvesting device of claim 1, wherein at least one of the first and second frictional layers is formed of only an elastic material comprising at least one selected from polydimethylsiloxane, polyurethane, and nylon.

3. The triboelectric energy harvesting device of claim 1, wherein the elastic structure comprises at least one of a hollow structure and a thin film structure having a thickness of about 0.01 μm to about 200 μm.

4. The triboelectric energy harvesting device of claim 3, wherein the hollow structure comprises at least one of a mesh structure and a fabric structure.

5. The triboelectric energy harvesting device of claim 1, wherein both the first and second frictional layers are formed of only an elastic material and are provided in elastic structures.

6. The triboelectric energy harvesting device of claim 1, further comprising:
   a first electrode layer laminated on the first frictional layer or formed inside the first frictional layer; and
   a second electrode layer laminated on the second frictional layer or formed inside the second frictional layer.

7. The triboelectric energy harvesting device of claim 1, wherein at least one of the first and second frictional layers is formed of a conductive material so as to have a function as an electrode layer.

8. The triboelectric energy harvesting device of claim 1, wherein at least one first frictional layer provided with a first electrode layer therein and at least one second frictional layer provided with a second electrode are alternately laminated.

9. The triboelectric energy harvesting device of claim 1, wherein at least one of the first and second frictional layer has elasticity of about 10% to about 1000%.

10. The triboelectric energy harvesting device of claim 1, wherein at least one of the first and second surfaces has a pattern structure having an uneven shape.

11. The triboelectric energy harvesting device of claim 10, wherein the pattern structure is formed to have intervals of about 1 nm to about 1000 nm.

12. The triboelectric energy harvesting device of claim 10, wherein the pattern structure comprises a plurality of protrusions which protrude from at least one of the first and second surfaces, and
   at least one of the protrusions comprises at least one of a pyramidal, pillar, and hemispherical shape.

13. The triboelectric energy harvesting device of claim 1, wherein the lattice structure is formed to have intervals of about 1 μm to about 1000 μm.

14. The triboelectric energy harvesting device of claim 1, wherein the spacer is formed to have intervals different from each other in at least two or more regions on the first surface.

15. A method for manufacturing a triboelectric energy harvesting device comprising:
- manufacturing a first frictional layer provided with a first surface having first electron affinity;
- manufacturing a second frictional layer provided with a second surface having second electron affinity; and
- disposing the first and second frictional layers such that the first and second surfaces face each other,
- wherein at least one of the first and second frictional layers is manufactured to have an elastic material and an elastic structure,
- wherein the first frictional layer comprises a spacer formed on the surface to form a space part bet the first and the second frictional layers such that the second surface is spaced apart from the first surface, and an end of the spacer being brought into contact with the second surface,
- wherein the spacer has elasticity, the spacer being d of the same material as the first surface of the first frictional layer, and
- wherein the spacer is formed in a lattice structure on the first surface.

16. The triboelectric energy harvesting device of claim 15, wherein the manufacturing of the first frictional layer comprising:
- manufacturing a mold having a reverse pattern structure of a first pattern structure having an uneven shape on the first surface;
- forming a groove having a reverse shape to a spacer on the mold;
- applying and curing a material for forming the first frictional layer on the mold; and
- separating the first frictional layer from the mold.

17. The triboelectric energy harvesting device of claim 15, wherein at least one of the first and second frictional layers is formed through at least one selected from a photography method, an imprinting method, an inkjet printing method, a drawing method, an electrospinning method, and an electrospray method.

18. The triboelectric energy harvesting device of claim 15, further comprising forming electrode layers on the first and second frictional layers or inside the first and second frictional layers.

* * * * *